United States Patent [19]

Kawaguchi et al.

[11] 4,302,336

[45] Nov. 24, 1981

[54] SEMIPERMEABLE COMPOSITE MEMBRANE

[75] Inventors: Takeyuki Kawaguchi; Yutaka Taketani; Noriaki Sasaki; Hiroyoshi Minematsu; Yuzuru Hayashi; Shigeyoshi Hara, all of Iwakuni, Japan

[73] Assignee: Teijin Limited, Japan

[21] Appl. No.: 72,044

[22] Filed: Sep. 4, 1979

[30] Foreign Application Priority Data

Sep. 6, 1978 [JP] Japan .................. 53-108472

[51] Int. Cl.$^3$ .................. B01D 3/00; B01D 13/00
[52] U.S. Cl. .................. 210/654; 210/500.2; 427/245
[58] Field of Search .................. 210/22 A, 22 R, 22 C, 210/321 R, 321 A, 321 B, 500 M, 490, 23 H, 23 F, 23 R; 264/49, 41, 45.1; 427/245

[56] References Cited

U.S. PATENT DOCUMENTS

| 3,083,118 | 3/1963 | Bridgeford | 117/47 |
| 3,133,132 | 5/1964 | Loeb et al. | 264/49 |
| 3,133,137 | 5/1964 | Loeb et al. | 264/233 |
| 3,723,306 | 3/1973 | Bridgeford | 210/22 R |
| 3,950,257 | 4/1976 | Ishii et al. | 210/500 M |
| 3,951,815 | 4/1976 | Wrasidlo | 210/500 M |
| 4,005,012 | 1/1977 | Wrasidlo | 210/23 H |
| 4,039,440 | 8/1977 | Cadotte | 210/23 H |
| 4,177,150 | 12/1979 | Inoue et al. | 210/500 M |

Primary Examiner—Frank A. Spear, Jr.
Attorney, Agent, or Firm—Wenderoth, Lind & Ponack

[57] ABSTRACT

A semipermeable composite membrane comprising a thin semipermeable film of a polymeric material deposited on one side of a microporous substrate, said polymeric material being prepared by crosslinking a soluble polymer containing at least 30 mole % of a recurring unit of the formula

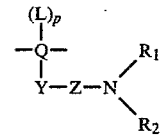

wherein all symbols are as defined in claim 1, and having at least 0.2 milliequivalent, per gram of said polymer, of an amino group containing 1 or 2 active hydrogen atoms, with a polyfunctional compound containing at least two functional groups capable of reacting with the amino group having 1 or 2 active hydrogen atoms; and a process for preparing the same. The semipermeable composite membrane of this invention is especially useful for desalination of saline or brackish water by reverse osmosis.

38 Claims, No Drawings

SEMIPERMEABLE COMPOSITE MEMBRANE

TECHNICAL FIELD

This invention relates to a novel semipermeable composite membrane. More specifically, this invention pertains to a novel semipermeable composite membrane which has high performances in selective permeability characteristics such as water flux and said rejection particularly suitable for reverse osmosis, chemical resistances such as oxidation resistance, acid resistance and alkali resistance, compactness, and thermal stability, and which can be stored in the dry state; to a process for production thereof; and to use of the aforesaid composite membrane in reverse osmosis.

BACKGROUND ART

The semipermeable membrane is a membrane which has selective permeability to specified molecules. It is frequently used to remove very small amounts of contaminated molecules dissolved or diffused in a liquid or gas.

In recent years, reverse osmosis has attracted a great deal of interest for utilization in fields involving purification of liquids. This is of special importance when utilizing this system in the purification of water and brackish water. Likewise, the process is also used to remove impurities from liquids such as water or, in the fields of dialysis, blood. When utilizing reverse osmosis in the purification of a brackish water, a pressure in excess of the osmotic pressure of the brackish water feed solution is applied to the solution which is prepared from purified water by a semipermeable membrane. Pure water thereby diffuses through the membrane while the sodium chloride molecules or other impurities which may be present in the water are retained by the membrane.

The efficiency of the reverse osmosis method is greatly affected by the properties of the semipermeable membrane used. Much effort has therefore been made to develop membranes having high performance, and resulted in some specific suggestions.

For example, U.S. Pat. Nos. 3,133,132 and 3,133,137 disclose the early Loeb-type membranes made of cellulose diacetate. These membranes are asymmetric membranes which are characterized by a very thin, dense surface layer or skin that is supported upon an integrally attached, much thicker supporting layer. These known membranes based on cellulose diacetate have the defects of poor compaction, low resistance to chemical and biological degradation, a short useful like, inability of storage in the dry state, and insufficient flux and salt rejection characteristics.

In an attempt to overcome these defects of the Loeb-type membranes, some membranes composed basically of synthetic polymers have recently been suggested. For example, U.S. Pat. No. 3,951,815 discloses a composite semipermeable membrane comprising a microporous substrate and an ultrathin film formed of a crosslinked, grafted polyethylenimide disposed on one surface of said microporous substrate that has been crosslinked with a di- or tri-functional compound such as isophthaloyl chloride and grafted with a graft reactant such as acrylonitrile or epichlorohydrin. U.S. Pat. No. 4,005,012 describes a composite semipermeable membrane comprising an ultrathin film formed by contacting an amine-modified polyepihalohydrin with a polyfunctional agent on a microporous substrate to form this film on one surface of the microporous substrate. Also, U.S. Pat. No. 4,039,440 discloses a reverse osmosis membrane prepared in situ on a porous support by initial formation of a layer of polyethylenimine on the support, followed by interfacial reaction with a polyfunctional reagent to produce a thin surface coating which possesses salt barrier characteristics.

The membrane composed basically of crosslinked polyethylemimine disclosed in U.S. Pat. No. 4,039,440 has a high salt rejection, but has the defect of insufficient water flux and low oxidation resistance (e.g., low resistance to deterioration by the presence of chlorine in the feed saline or brackish water). As one method of improving the oxidation resistance, U.S. Pat. No. 3,951,815 suggests the grafting of acrylonitrile to the polyethylenimine. The acrylonitrile-grafted and crosslinked polyethylenimine shows some improvement in oxidation resistance, but as the membrane is operated continuously for a long period of time, its degradation advances gradually. Moreover, it suffers from the serious defect of having a markedly reduced water flux.

The membrane composed basically of the amine-modified polyepihalohydrin disclosed in U.S. Pat. No. 4,005,012 exhibits a high salt rejection but its water flux is not sufficient. It has been strongly desired to develop membranes having a higher water flux.

The characteristics required of semipermeable membranes are basically high permselectivity and a high flux. In addition, they should have high resistance to compaction, superior resistance to chemical and biological degradation, and sufficient flexibility to endure shaping into modules in actual use such as a tube, spiral or hollow filament. The membranes so far suggested lack one or more of these characteristics, and are not entirely satisfactory for use as semipermeable membranes.

Accordingly, it has been strongly desired in the art to develop membranes having a combination of the aforesaid desired characteristics.

DISCLOSURE OF THE INVENTION

It is an object of this invention to provide a semipermeable membrane which is free from the defects of conventional reverse osmosis membranes.

Another object of this invention is to provide a semipermeable composite membrane having high permselectivity and flux, superior flexibility, high resistance to compaction, high resistance to chemical and biological degradation and excellent storability in the dry state especially high permselectivity and/or superior resistance to oxidation.

Still another object of this invention is to provide a process for producing a semipermeable composite membrane having high permselectivity and flux, superior flexibility, high resistance to compaction, high resistance to chemical and biological degradation, and storability in the dry state.

A further object of this invention is to provide a method for using the aforesaid semipermeable composite membrane for the reverse osmotic desalination of saline or brackish water.

Other objects and advantages of this invention will become apparent from the following description.

According to this invention, there is provided a semipermeable composite membrane comprising a thin semipermeable film of a polymeric material deposited on one side of a microporous substrate, said polymeric material being prepared by crosslinking a soluble polymer containing at least 30 mole% of a recurring unit of the formula

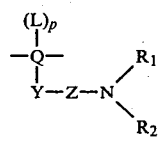 (I)

wherein Q represents an organic radical containing 2 to 30 carbon atoms and having a valence of (3+p) which optionally contains a heteroatom selected from the group consisting of oxygen, sulfur, nitrogen and halogen atoms; Y is bonded to the carbon atom in group Q and represents a direct bond, an alkylene group containing 1 to 3 carbon atoms or an unsubstituted or substituted phenylene group; Z represents

or —$SO_2$—; $R_1$ represents a hydrogen atom, or a monovalent organic radical containing 1 to 20 carbon atoms which may contain an amino group containing 1 to 2 active hydrogen atoms and a heteroatom selected from the group consisting of oxygen, nitrogen and halogen atoms, $R_2$ represents an amino group containing 1 to 2 active hydrogen atoms or a monovalent organic radical containing 1 to 20 carbon atoms which contains an amino group containing 1 to 2 active hydrogen atoms and may contain a heteroatom selected from the group consisting of oxygen, nitrogen and halogen atoms, or $R_1$ and $R_2$, together with the nitrogen atom to which they are bonded, represent a 5- to 18-membered nitrogen-containing heterocyclic ring which contains at least one amino group having one active hydrogen atom, and when group Y represents a direct bond and group Z represents

$R_1$ may represent

bonded to that carbon atom of the group Q which is bonded, either directly or through 1 to 2 carbon atoms, to the carbon atom to which the group Y is bonded; p is 0, 1 or 2; and when p is 1 or 2, L represents the group

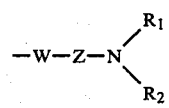

in which W represents a direct bond or an alkylene group containing 1 to 3 carbon atoms and Z, $R_1$ and $R_2$ are as defined above,
and having at least 0.2 milliequivalent, per gram of said polymer, of an amino group containing 1 to 2 active hydrogen atoms, with a polyfunctional compound containing at least two functional groups capable of reacting with the amino group having 1 or 2 active hydrogen atoms.

The essential feature of the present invention consists in the use of, as a starting material for the semipermeable membrane, a polymer containing at least 30 mole% of the recurring unit of formula (I) in which a pendant chain containing at least one amino group having 1 or 2 active hydrogen atoms (to be sometimes referred to hereinbelow as an "active amino group") is bonded to the main chain of the polymer through amide or imide linkages.

Thus, the polymer used in this invention retains high hydrophilicity because it contains many amide or imide linkages as hydrophilic atomic groupings in the pendant chains. Moreover, since the polymer contains an active amino group in the pendant chain, crosslinking of the polymer with the polyfunctional compound (to be referred to as a "crosslinking agent") having functional groups such as acid halide, sulfonyl halide, N-haloformyl, haloformate and acid anhydride groups easily changes the active amino group to a linkage such as a carbonamide (or -imide) linkage

sulfonamide linkage

urea linkage

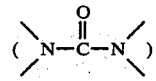

or urethane linkage

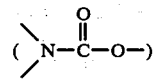

which is stable to oxidation, and thus gives a crosslinking site having superior chemical stability such as oxidation resistance, simultaneously providing superior basic performances, e.g. high water permeability and high salt rejection characteristics which are required of a reverse osmosis membrane.

DETAILED DESCRIPTION OF THE INVENTION

The essential feature of the present invention is the use of a polymer containing a recurring unit of the formula

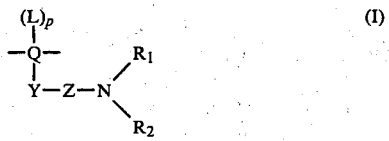 (I)

wherein Q, Y, Z, $R_1$, $R_2$, L and p are as defined above, as a raw material for the semipermeable membrane.

In formula (I), the organic radical having a valence of (3+p) expressed by Q constitutes at least a part of the main chain of the aforesaid polymer, and is a constituent component of a vinyl polymer such as an acrylic polymer, methacrylic polymer, styrene polymer, allyl polymer or diallyl polymer, or an aromatic polymer such as polyphenylene oxide or polyphenylsulfone. The organic radical Q may contain a heteroatom selected from the group consisting of oxygen, sulfur, nitrogen and halogens, which may be present in various forms. For example, the oxygen may be present in such a form as an ether linkage (C—O—C), an oxo group (C=O), a hydroxyl group (—OH), a sulfonyl group (—$SO_2$—), a sulfo group (—$SO_3H$), a carboxyl group (—COOH), or a lower alkyl ester group. The nitrogen atom may be present in such a form as an amide linkage, a tertiary amino group, a quaternary ammonium salt group, a nitro group, a cyano group, or an active amino group.

The halogen atom may be any of fluorine, chlorine, bromine and iodine groups, of which chlorine and bromine atoms are preferred.

When the organic radical contains heteroatoms, the number of the heteroatoms is generally up to 5, preferably up to 2. The organic radical should contain 2 to 30 carbon atoms, preferably 2 to 20 carbon atoms, more preferably 2 to 15 carbon atoms.

It should be understood that the present invention does not exclude the presence of heteroatoms other than oxygen, sulfur, nitrogen and halogens in the organic group, and the presence of other heteroatoms such as alkali metal atoms is permissible.

The organic radical includes saturated linear aliphatic hydrocarbon radicals, saturated alicyclic hydrocarbon radicals, and aromatic hydrocarbon radicals which optionally contain the heteroatoms described hereinabove.

Thus, when Q represents a saturated aliphatic hydrocarbon group optionally containing a heteroatom, typical examples of the recurring unit of formula (I) are those of the following formula (I-a)

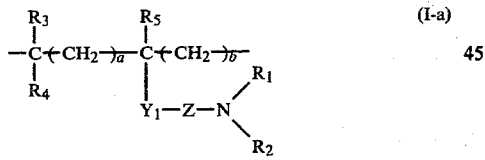

wherein $R_3$ represents a hydrogen atom or an alkyl group containing 1 to 5 carbon atoms;

$R_4$ and $R_5$, independently from each other, represent a hydrogen atom, an alkyl group containing 1 to 5 carbon atoms, or the group

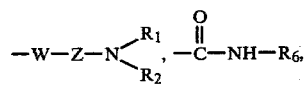

—$R_7$—COO$R_8$, —O—$R_{81}$, or —O—$R_{82}$—X', in which $R_6$ represents a hydrogen atom or an alkyl group containing 1 to 5 carbon atoms, $R_7$ represents a direct bond or an alkylene group containing 1 to 3 carbon atoms, $R_8$ represents a hydrogen atom, an alkali metal, a quaternary ammonium salt radical or an alkyl group containing 1 to 5 carbon atoms, $R_{81}$ represents an alkyl group containing 1 to 5 carbon atoms, $R_{82}$ represents an alkylene group containing 1 to 4 carbon atoms, and X' represents chlorine or bromine;

W, Y, Z, $R_1$ and $R_2$ are as defined hereinabove; and a and b, independently from each other, are 0 to 1.

Typical examples of the recurring unit of formula (I) in which Q represents a saturated alicyclic hydrocarbon radical optionally containing the heteroatoms are those of the following formula (I-b):

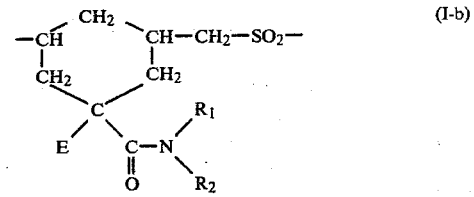

wherein

E represents a hydrogen atom or the group

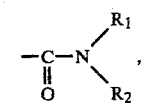

and $R_1$ and $R_2$ are as defined hereinabove.

Typical examples of the recurring unit of formula (I) in which Q represents an aromatic hydrocarbon radical optionally containing the heteroatoms include those of the following formula (I-c):

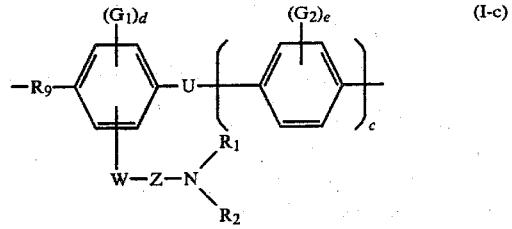

wherein $R_9$ represents a direct bond or the group

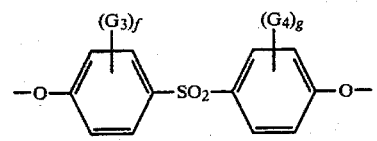

U represents

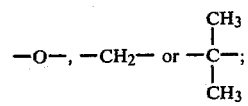

$G_1$ and $G_2$, independently from each other, represent a halogen atom, an alkyl group containing 1 to 3 carbon atoms, a haloalkyl group containing 1 to 3 carbon atoms or the group

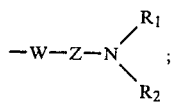

c, d and e, independently from each other, are 0 or 1;

G₃ and G₄, independently from each other, represent a halogen atom, an alkyl group containing 1 to 3 carbon atoms, or a haloalkyl group containing 1 to 3 carbon atoms;

f and g, independently from each other, are integers of 0 to 2; and

W, Z, R₁ and R₂ are as defined hereinabove.

In the above formulae (I), (I-a), (I-b) and (I-c), the "alkylene group containing 1 to 3 carbon atoms" represented by Y and W may be linear or branched, and includes, for example, methylene, ethylene, n-propylene and methylethylene groups. Of these, the methylene group is preferred.

Examples of the substituent on the benzene ring in the "substituted phenylene group" are a carboxyl group (—COOH), a sulfo group (—SO₃H), the group

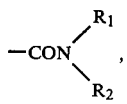

or the group

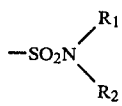

in which R₁ and R₂ are as defined above or R₁ and R₂ represent a hydrogen atom, or a methyl, ethyl, propyl or butyl group. Preferably, the substituted phenylene group is mono-substituted.

Generally, the group Y preferably represents a direct bond, a methylene group or a phenylene group of the formula

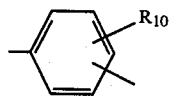

in which R₁₀ represents a hydrogen atom,

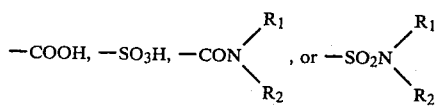

in which R₁ and R₂ are as defined above. Especially preferably, R₁₀ is a hydrogen atom. When Q represents an aromatic hydrocarbon radical [i.e., in the case of formula (I-c)], Y is especially preferably a direct bond or a methylene group.

In the above formulae (I), (I-a), (I-b) and (I-c), Z represents

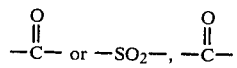

being especially preferred.

In the formulae (I), (I-a), (I-b) and (I-c), the group

is derived from an amine of the formula

as will be stated hereinbelow. Accordingly, the group

can represent a monovalent substituted amino group resulting from the removal of one active hydrogen atom from one amino group of a polyamino compound containing at least two active amino groups. Thus, it can be said that R₁ and R₂ in the above formulae are the remainder of the aforesaid polyamino compound left after the removal of the nitrogen atom to be bonded to the group Z and one active hydrogen atom bonded to this nitrogen atom. Specifically, R₁ represents a hydrogen atom or a monovalent organic radical containing 1 to 20 carbon atoms which may contain an amino group containing 1 to 2 active hydrogen atoms and a heteroatom selected from oxygen, nitrogen and halogen atoms, and R₂ represents an amino group containing 1 to 2 active hydrogen atoms, or a monovalent organic radical containing 1 to 20 carbon atoms which contains an amino group containing 1 to 2 active hydrogen atoms and may contain a heteroatom selected from oxygen, nitrogen and halogen atoms, or R₁ and R₂, together with the nitrogen atom to which they are bonded, may represent a 5- to 18 membered nitrogen-containing heterocyclic ring which contains at least one amino group having one active hydrogen. More specifically, R₁ represents a hydrogen atom, an alkyl, cycloalkyl, aryl, aralkyl or heterocyclic radical containing 1 to 20 carbon atoms, preferably 1 to 12 carbon atoms, and optionally containing 1 to 8, preferably 1 to 5, heteroatoms or heteroatom-containing atomic groupings selected from the group consisting of halogen atom (e.g., chlorine and bromine), hydroxyl groups, cyano groups, carboxyl groups, alkoxycarbonyl groups with the alkyl moiety having 1 to 5 carbon atoms (e.g., —COOCH₃, —COOC₂H₅ and —COOC₃H₇), primary amino groups (—NH₂), ether linkages (—O—), imino linkages (—NH—) and tertiary amino linkages $$(-\overset{|}{N}-);$$

and R₂ represents a primary amino group, a secondary amino group mono-substituted by an alkyl group containing 1 to 5 carbon atoms, or an alkyl, cycloalkyl, aryl, aralkyl or heterocyclic radical containing 1 to 20, preferably 1 to 12, carbon atoms which contains 1 to 10, preferably 1 to 6, primary amino groups or imino linkages and may contain 1 to 9, preferably 1 to 6, heteroatoms or heteroatom-containing atomic groupings selected from the group consisting of halogen atoms, hydroxyl groups, cyano groups, carboxyl groups, alkoxycarbonyl groups containing 1 to 5 carbon atoms, ether linkages and tertiary amino linkages

or R₁ and R₂, together with the nitrogen atom to which they are bonded, may represent a 5- to 18-membered nitrogen-containing heterocyclic ring optionally containing 1 to 4 nitrogen or oxygen atoms as heteroatoms, such as

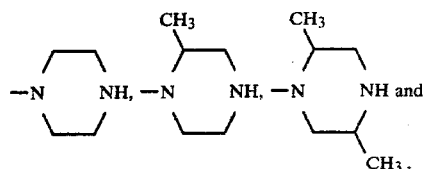

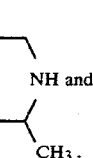

Typical examples of the groups R₁ and R₂ are given below. It should be understood that these examples are merely illustrate, and are not intended in any way to limit the scope of the present invention.

(1) Examples of R₁

H, —CH₃, —C₂H₅, —C₃H₇, 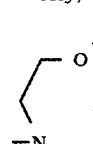

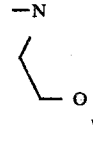—CH₂CH₂CN, —CH₂CH₂OH,

—CH₂CHCH₂OH, —CH₂CHCH₂Cl, —CH₂CH₂COOCH₃,
        |                    |
        OH                   OH
—CH₂CH₂COOC₅H₁₁, —CH₂CH₂COOC₃H₇, —CH₂CH₂NH₂,
—CH₂CH₂NHCH₃ —CH₂OCH₃, —CH₂CH₂OCH₃, and
                                      —CH₂CH=CH₂.

(2) Examples of R₂

—NH₂, —NHCH₃, ⁺CH₂⁾₃̄—N⁺CH₂⁾₃̄—NH₂,
                   |
                   CH₃

R₂₄—NH—CH₂—C⁺CH₃)₂ (R₂₄ = C₁-C₅ alkyl),
—CH₂—CH₂NH₂, ⁺CH₂—CH₂—NH⁾ₓ₁̄H(x₁ = 1-20),
        ⁺CH₂⁾ₓ₂̄—NH₂(x₂ = 1-10),
—CH₂—CH₂—N—CH₂—CH₂—NH₂,
          |
          CH₂—CH₂—NH₂

-continued
—CH₂—CH₂—N—CH₂—CH₂—N—CH₂—CH₂—NH₂,
          |              |
          CH₂—CH₂—NH₂    CH₂—CH₂—NH₂
R₂₅NH⁺CH₂⁾ₓ₃̄—(R₂₅ = C₁-C₅ alkyl; (x₃ = 2-10)
—CH₂—CH₂—O—CH₂—CH₂—NH₂,
—CH₂—CH₂—CH₂—O—CH₂—CH₂—CH₂—NH₂,
HO—CH₂—CH—CH₂—NH⁺CH₂—CH₂—NH⁾ₓ₆̄—CH₂CH₂—
            |
            OH
—CH₂—CH₂—N—CH₂—CH₂—N—CH₂—CH₂—CH₂—NH₂.
          |              |
          CH₂—CH₂—Cl     CH₂—CH₂—NH₂

(x₆ = an integer of 1-20)

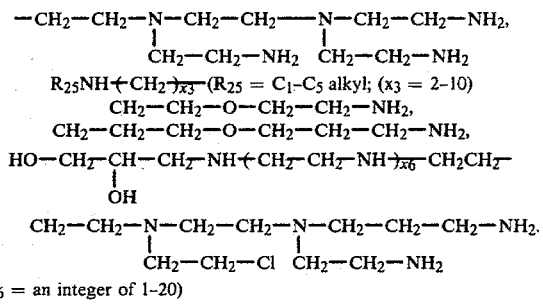

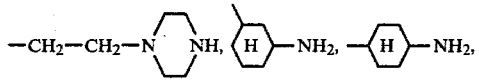

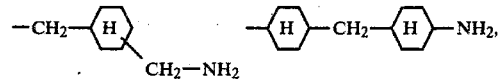

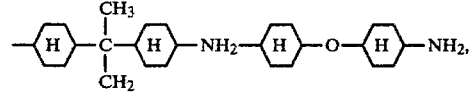

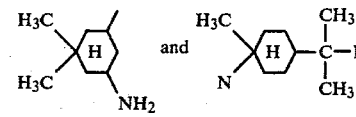

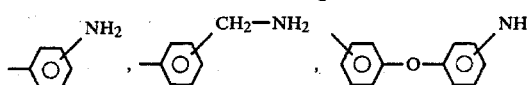

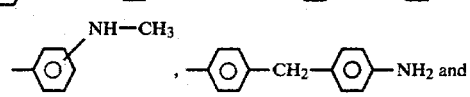

(3) Examples of the heterocyclic ring formed by R₁ and R₂

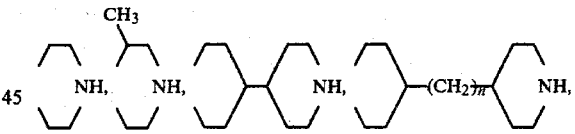

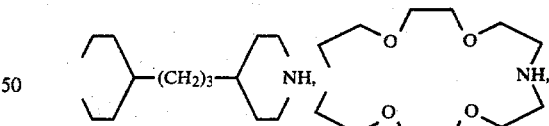

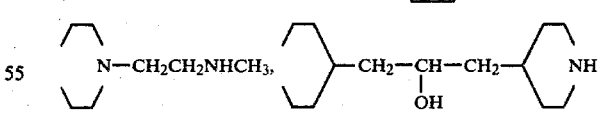

The term "alkyl group", used in the present specification and the appended claims, denotes a linear or branched saturated monovalent aliphatic hydrocarbon group, and includes, for example, methyl, ethyl, n- or iso-propyl, n-, iso-, sec- or tert-butyl, n-pentyl, iso-amyl, n-hexyl, and n-octyl.

The term "cycloalkyl group", as used herein, denotes a monovalent saturated alicyclic hydrocarbon group such as cyclopentyl, cyclohexyl, cycloheptyl or cyclooctyl.

The term "aryl" denotes a monocyclic or polycyclic aromatic hydrocarbon such as phenyl, tolyl, xylyl or naphthyl.

The term "aralkyl group", as used herein, denotes an aryl-substituted lower alkyl group in which the aryl and alkyl have the same meanings as described above. Typical examples are benzyl and phenethyl.

The term "heterocyclic group", as used herein, denotes a monovalent cyclic group preferably with 5 or 6 members, in which at least one, preferably 1 to 2, ring members are heteroatoms such as oxygen or nitrogen, and the remainder of the ring members consists of carbon atoms. Specific examples are as follows:

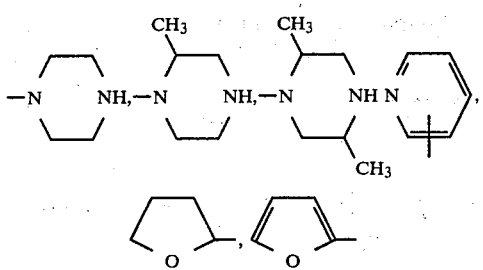

The term "lower", used in the present specification and appended claims to qualify groups or compounds, denotes that the groups or compounds so qualified have not more than 4, preferably not more than 3, carbon atoms.

The polyamino compound which will provide $R_1$ and $R_2$ contains at least two active amino groups, i.e. primary amino groups ($-NH_2$) or secondary amino groups ($-NH-$, also called imino group), which can react with the polyfunctional compound.

The polyamino compound used in this invention is not particularly limited in its type so long as it contains at least two of primary amino groups, secondary amino groups, or both per molecule. It may range from a low-molecular-weight compound to a high-molecular-weight compound, and may be linear or branched. It may further contain an aromatic ring, heterocyclic ring or alicyclic ring. The structural moiety of the polyamino compound excluding the reactive amino groups may contain heteroatoms such as oxygen and halogen in addition to carbon and hydrogen atoms. The active amino groups can be present at the ends or side chains of the molecular chain, and secondary amino groups may be incorporated in the molecular chain.

The number of the primary and secondary amino groups that can be present in the polyamino compound may be at least two, and no strict upper limit is set up. However, from the standpoint of the characteristics, especially salt rejection, of the resulting membrane, the polyamino compound suitably has an "amino equivalent" of generally 10 to 40 milliequivalents (to be abbreviated "meq") per gram of the polyamino compound, preferably 15 to 35 meq/g, especially preferably 20 to 30 meq/g.

The term "amino equivalent", as used in the present specification, denotes the sum of the equivalents of primary and secondary amino groups contained per gram of the polyamino compound. The sum of the equivalents of the primary and secondary amino groups can be determined generally by a known determination method (such as the perchloric acid-glacial acetic acid method, or the azomethine method).

Desirably, the two or more active amino groups present in the polyamino compound should not be spaced too far from one another. It is advantageous that the number of carbon atoms which constitute the chain connecting two adjacent active amino groups in the same molecule is generally not more than 15, preferably not more than 10, and more preferably 2 to 5.

The molecular weight of the polyamino compound is not critical, and may range from a low molecular weight to a high molecular weight. From the standpoint of the characteristics, especially oxidation resistance, of the resulting membrane, suitable polyamino compounds have a molecular weight of generally not more than 1000, preferably 60 to 500, especially preferably 100 to 300.

Polyamino compounds that can be used in this invention can be selected from any known polyamino compounds which have the aforesaid characteristics. Typical examples are given below. We do not intend however to limit the scope of the invention by the following exemplification.

(1) Aliphatic polyamines

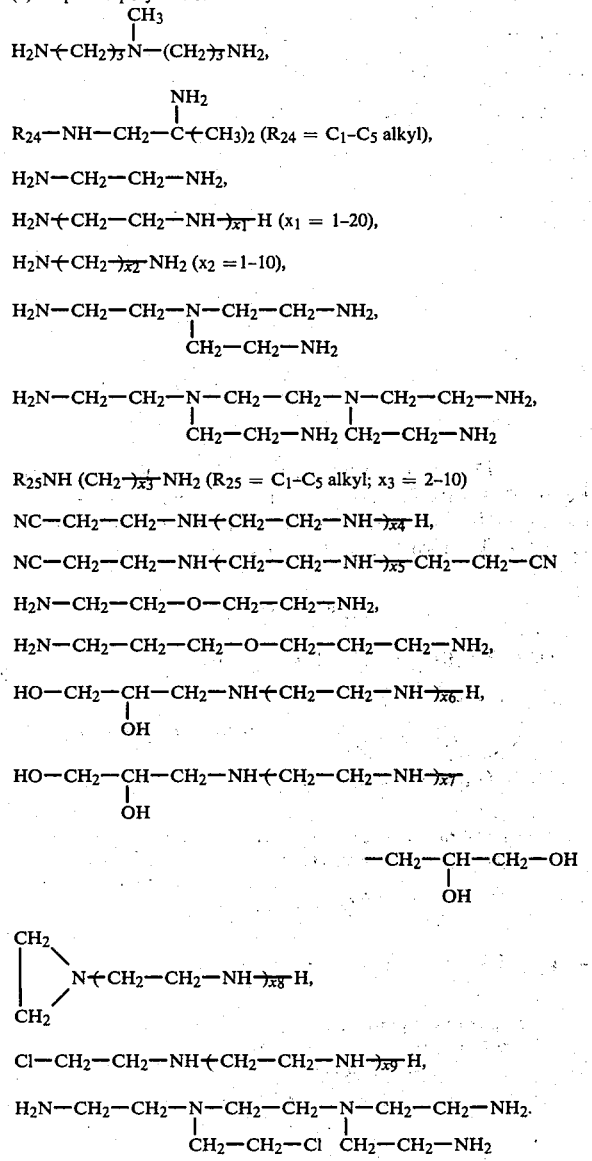

-continued ($x_4$–$x_8$ = an integer of 1–20, $x_9$ = an integer of 1–10)

(2) Alicyclic polyamines

HN⟨ ⟩NH, HN⟨ ⟩NH ($R_{26}$ = H or $CH_3$, $C_2H_5$,
         ($R_{26}$)$_{x_{11}}$ $x_{11}$ = an integer of 1–8), $H_2N-CH_2-CH_2-N$⟨ ⟩NH, $CH_2-NH-CH_2-CH_2-N$⟨ ⟩NH  HN⟨ ⟩—$(CH_2)_3$—⟨ ⟩NH,

⟨H⟩—$NH_2$, $H_2N$—⟨H⟩—$NH_2$, HN⟨ ⟩—⟨ ⟩NH
  $NH_2$ $H_2N-CH_2$—⟨H⟩—$CH_2-NH_2$

HN⟨O O⟩NH,
  ⟨O O⟩

$H_2N$—⟨H⟩—$CH_2$—⟨H⟩—$NH_2$, $H_2N$—⟨H⟩—$\underset{CH_3}{\overset{CH_3}{C}}$—⟨H⟩—$NH_2$ $H_2N$—⟨H⟩—O—⟨H⟩—$NH_2$, $H_3C$     $NH_2$
    ⟨H⟩         and
$H_3C$     $NH_2$ $H_3C$     $CH_3$
    ⟨H⟩—$\underset{CH_3}{\overset{|}{C}}$—$NH_2$.
$H_2N$ (3) Aromatic polyamines $H_2N$—⟨O⟩—$NH_2$, $H_2N$—⟨O⟩—$CH_2-NH_2$, $H_2N$—⟨O⟩—O—⟨O⟩—$NH_2$, $H_2N$—⟨O⟩—NH—$CH_3$, $H_2N$—⟨O⟩—$CH_2$—⟨O⟩—$NH_2$ and $H_2N$—⟨N⟩—$NH_2$.

(4) Hydrazines $H_2N \cdot NH_2$, $H_2N \cdot NHCH_3$, $CH_3 \cdot NH \cdot NH \cdot CH_3$ These polyamino compounds can be used either alone or as a mixture of two or more.

Polyamino compounds that can be used advantageously in this invention are aliphatic or alicyclic polyamino compounds expressed by the following formula (II-a), (II-b), (II-c), (II-d) or (II-e).

$A_1-NH-A_2-NH-A_3$ (II-a)

$A_4-NH(CH_2-CH_2-N)_i A_5$ (II-b)
                    $|$
                    $A_6$

HN⟨ ⟩N—$A_7$—NH—$A_8$ (II-c)

HN⟨ ⟩—$A_9$—⟨ ⟩NH or (II-d)

$A_{10}$  $A_{11}$
           \  /
HN⟨ ⟩       ⟨ ⟩NH (II-e)
           /
         $A_{12}$ wherein $A_1$ and $A_3$, independently from each other, represent a hydrogen atom or a lower alkyl group; $A_2$ represents an alkylene group having 2 to 10 carbon atoms which may contain an ether linkage; $A_4$ and $A_5$, independently from each other, represent a hydrogen atom or a lower alkyl group optionally substituted with a cyano, hydroxyl or lower alkoxycarbonyl group; $A_6$ represents a hydrogen atom or a group of the formula —$CH_2$—$CH_2$—NH-$A_4$; $A_7$ represents a lower alkylene group; $A_8$ represents a hydrogen atom or a lower alkyl group optionally substituted with a cyano, hydroxyl or lower alkoxycarbonyl group; $A_9$ represents a lower alkylene group; at least one of $A_{10}$, $A_{11}$ and $A_{12}$ represents a lower alkyl group, and the remainder represent a hydrogen atom; and i is an integer of 2 to 6.

Of the polyimino compounds of formulae (II-a), (II-b), (II-c), (II-d) and (II-e), those of formulae (II-b) and (II-e) are especially preferred.

Typical examples of the polyimino compounds of formulae (II-a) and (II-e) include the following.

Type (II-a)

$H_2NCH_2CH_2NH_2$, $H_2NCH_2CH_2CH_2NH_2$, $H_2N(CH_2)_3NH_2$,
$CH_3NHCH_2CH_2NHCH_3$, $CH_3NHCH_2CH_2CH_2NHCH_3$,
$CH_3NHCH_2HH_2CH_2CH_2NHCH_3$, $C_2H_5NHCH_2CH_2NHC_2H_5$,
$C_2H_5NHCH_2CH_2CH_2NHC_2H_5$,
$C_2H_5NHCH_2CH_2CH_2CH_2NHC_2H_5$,
$HOCH_2CH_2NHCH_2CH_2CH_2NHCH_2CH_2OH$,
$HOCH_2CH_2NHCH_2CH_2CH_2CH_2NHCH_2CH_2OH$,
$H_2NCH_2CH_2-O-CH_2CH_2NH_2$
$CH_3NH-CH_2CH_2-OCH_2CH_2NHCH_3$,
$HOCH_2CH_2NHCH_2CH_2NHCH_2CH_2OH$,

Type (II-b)

H$_2$N$(\text{CH}_2\text{CH}_2\text{NH})_2$—H, H$_2$N$(\text{CH}_2\text{CH}_2\text{NH})_3$—H
CH$_3$NH$(\text{CH}_2\text{CH}_2\text{NH})_2$—CH$_3$, CH$_3$NH$(\text{CH}_2\text{CH}_2\text{NH})_3$—CH$_3$,
CH$_3$NH$(\text{CH}_2\text{CH}_2\text{NH})_4$CH$_3$,
CH$_3$NHCH$_2$CH$_2$NCH$_2$CH$_2$NHCH$_3$
　　　　　　　｜
　　　　　　CH$_2$CH$_2$NHCH$_3$ H$_2$N$(\text{CH}_2\text{CH}_2\text{NH})_4$—H, H$_2$N—CH$_2$CH$_2$N—CH$_2$CH$_2$NH$_2$
　　　　　　　　　　　　　　｜
　　　　　　　　　　CH$_2$CH$_2$NH$_2$ HOCH$_2$CH$_2$NH$(\text{CH}_2\text{CH}_2\text{NH})_2$—CH$_2$CH$_2$OH,
HOCH$_2$CH$_2$NH$(\text{CH}_2\text{CH}_2\text{NH})_3$—CH$_2$CH$_2$OH,

Type (II-c)

HN⟨ ⟩N—CH$_2$CH$_2$NH$_2$, HN⟨ ⟩N—CH$_2$CH$_2$NHCH$_3$,

HN⟨ ⟩N—CH$_2$CH$_2$NHC$_2$H$_5$, HN⟨ ⟩N—CH$_2$CH$_2$NHCH$_2$CH$_2$OH,

HN⟨ ⟩N—CH$_2$CH$_2$NHCH$_2$CH$_2$CN,

Type (II-d)

[piperazine dimer structures with NH, CH$_2$, CH$_2$CH$_2$, CH$_2$CH$_2$CH$_2$, CH$_2$CHCH$_2$–OH bridges]

Type (II-e)

[piperazine structures with CH$_3$, (CH$_3$)$_2$, C$_2$H$_5$ substituents]

When in formula (I), the group Y represents a direct bond and the group Z represents $$-\overset{O}{\underset{\|}{C}}-,$$

R$_1$ may represent $$-\overset{O}{\underset{\|}{C}}-$$

bonded to that carbon atom of the group Q which is bonded, either directly or through 1 or 2 carbon atoms, to the carbon atom to which the group Y is bonded. In this case, the recurring unit (I) is typically expressed by the following formula (I-d):

$$\begin{array}{c} R_{11} \quad\quad R_{12} \\ -C(\text{CH}_2)_h C- \\ O=C \quad\quad C=O \\ \diagdown N \diagup \\ | \\ R_{13} \end{array} \quad (\text{I-d})$$

wherein

R$_{11}$ and R$_{12}$, independently from each other, represent a hydrogen atom or a methyl group;

R$_{13}$ represents a primary amino group, a secondary amino group mono-substituted by an alkyl group containing 1 to 5 carbon atoms, or an alkyl, cycloalkyl, aryl, aralkyl or heterocyclic group containing 1 to 20 carbon atoms which contains 1 to 10 primary amino groups or imino linkages and may contain 1 to 9 heteroatoms or heteroatom-containing atomic groupings selected from the group consisting of halogen atoms, hydroxyl groups, cyano groups, carboxyl groups, alkoxycarbonyl groups with the alkyl moiety containing 1 to 5 carbon atoms, ether linkages and tertiary amino linkage $$(-\overset{|}{\underset{}{N}}-);$$

and h is 0 or 1.

Specific examples of the group R$_{13}$ are as follows:

$$\begin{array}{c} \text{CH}_3 \\ | \\ (\text{CH}_2)_3-\text{N}-(\text{CH}_2)_3\text{NH}_2, \end{array}$$

R$_{24}$—NH—CH$_2$—C—(CH$_3$)$_2$   R$_{24}$ = C$_1$-C$_5$ alkyl),

—CH$_2$—CH$_2$—NH$_2$, $(\text{CH}_2-\text{CH}_2-\text{NH})_{x1}$—H (x$_1$ = 1-20), $(\text{CH}_2)_{x2}$—NH$_2$ (x$_2$ = 1-10), —CH$_2$—CH$_2$—N—CH$_2$CH$_2$NH$_2$,
　　　　　　　　　　　　　　　　　　　　　　　｜
　　　　　　　　　　　　　　　　　　　CH$_2$—CH$_2$—NH$_2$ —CH$_2$—CH$_2$—N—CH$_2$—CH$_2$——N—CH$_2$—CH$_2$—NH$_2$,
　　　　　　　｜　　　　　　　　　　　｜
　　CH$_2$—CH$_2$—NH$_2$　CH$_2$—CH$_2$—NH$_2$ R$_{25}$NH (CH$_2$)$_{x3}$ (R$_{25}$ = C$_1$-C$_5$ alkyl; x$_3$ = 2-10)

—CH$_2$—CH$_2$—O—CH$_2$—CH$_2$—NH$_2$,

—CH$_2$—CH$_2$—CH$_2$—O—CH$_2$CH$_2$—CH$_2$—NH$_2$,

—CH$_2$—CH$_2$—N—CH$_2$—CH$_2$——N—CH$_2$—CH$_2$—NH$_2$,
　　　　　　　｜　　　　　　　　　　　｜
　　CH$_2$—CH$_2$—Cl　　CH$_2$—CH$_2$—NH$_2$

—CH$_2$—CH$_2$—N⟨ ⟩NH, ⟨H⟩—NH$_2$, —⟨H⟩—NH$_2$,

—CH$_2$—⟨H⟩,　　　　　，—⟨H⟩—CH$_2$—⟨H⟩—NH$_2$,
　　　｜
　CH$_2$—NH$_2$

CH$_3$
　　　　　　｜
—⟨H⟩—C—⟨H⟩—NH$_2$, —⟨H⟩—O—⟨H⟩—NH$_2$,
　　　　　　｜
　　　　　　CH$_3$

H₃C\\\/H\\\/CH₃ (with H₃C, H₃C, NH₂), H₃C\\\/H\\\/ C(CH₃)(CH₃)—NH₂ (with NH₂), phenyl—NH₂, H₂N—phenyl—CH₂—, phenyl—O—phenyl—NH₂, phenyl—NH—CH₃, —phenyl—CH₂—phenyl—NH₂ and pyrrolidine-NH₂.

Especially preferred among the recurring units of formula (I-a) are those of the following formula (I-a-1):

$$-\overset{R_{301}}{\underset{R_{401}}{C}}(CH_2)_a-\overset{R_{501}}{\underset{Y_1-Z-N(R_{101})(R_{201})}{C}}(CH_2)_b- \quad \text{(I-a-1)}$$

wherein $R_{301}$ represents a hydrogen atom or a methyl group;

$R_{401}$ and $R_{501}$, independently from each other, represent a hydrogen atom, a methyl group, $$-\overset{O}{\underset{}{C}}-N(R_{101})(R_{201}), \quad -CH_2-\overset{O}{\underset{}{C}}-N(R_{101})(R_{201}),$$

$-COOR_{801}$, $-OR_{801}$, $-OCH_2CH_2X$ in which X is chlorine or bromine, or $-CH_2-COOR_{801}$;

$Y_1$ represents a direct bond, a methylene group or a phenylene group of the formula (phenylene with $R_{10}$)

in which $R_{10}$ represents a hydrogen atom, $-COOH$, $-SO_3H$, $-CON(R_{101})(R_{201})$, or $-SO_2N(R_{101})(R_{201})$;

Z represents $$-\overset{O}{\underset{}{C}}- \text{ or } -SO_2-;$$

$R_{101}$ represents a hydrogen atom, an alkyl, cycloalkyl, aryl, aralkyl or heterocyclic group containing 1 to 12 carbon atoms which may contain 1 to 8 heteroatoms or heteroatom-containing atomic groupings selected from the group consisting of halogen atoms, hydroxyl groups, cyano groups, carboxyl groups, alkoxycarbonyl groups with the alkyl moiety containing 1 to 5 carbon atoms, primary amino groups ($-NH_2$), ether linkages ($-O-$), imino linkages ($-NH-$), and tertiary amino linkages $$(-\overset{|}{N}-);$$

$R_{201}$ represents a primary amino group, a secondary amino group monosubstituted by an alkyl group containing 1 to 5 carbon atoms, or an alkyl, cycloalkyl, aryl, aralkyl or heterocyclic group containing 1 to 12 carbon atoms which contains 1 to 6 primary amino groups or imino linkages and may contain 1 to 6 heteroatoms or heteroatom-containing atomic groupings selected from the group consisting of halogen atoms, hydroxyl groups, cyano groups, carboxyl groups, alkoxycarbonyl groups with the alkyl moiety containing 1 to 5 carbon atoms, ether linkages and tertiary amino linkages $$(-\overset{|}{N}-);$$

$R_{101}$ and $R_{201}$, together with the nitrogen atom to which they are bonded, may represent a 5- to 6-membered nitrogen-containing heterocyclic ring which contains at least one amino group having one active hydrogen atom;

$R_{801}$ represents a hydrogen atom or an alkyl group containing 1 to 3 carbon atoms; and a and b, independently from each other, are 0 or 1. In particular, the group $$-N(R_{101})(R_{201})$$

in formula (I-a-1) is any of one of the following:

$-N(A_1)(A_2-NH-A_3)$      (II-a-1)

$-N(A_4)(-(CH_2CH_2N)-A_5)(A_6)$      (II-b-1)

$-N(A_8)(A_7-N\underset{\smile}{\frown}NH)$      (II-c-1)

$-N\underset{\smile}{\frown}-A_9-\underset{\smile}{\frown}NH$      (II-d-1)

$-N(A_{10})(A_{11})\cdots NH$ with $A_{12}$      (II-e-1)

In the above formulae, $A_1$ through $A_{12}$ are the same as those defined in formulae (II-a) to (II-e) hereinabove.

Thus, typical examples of the recurring unit of formula (I-a-1) include the following.

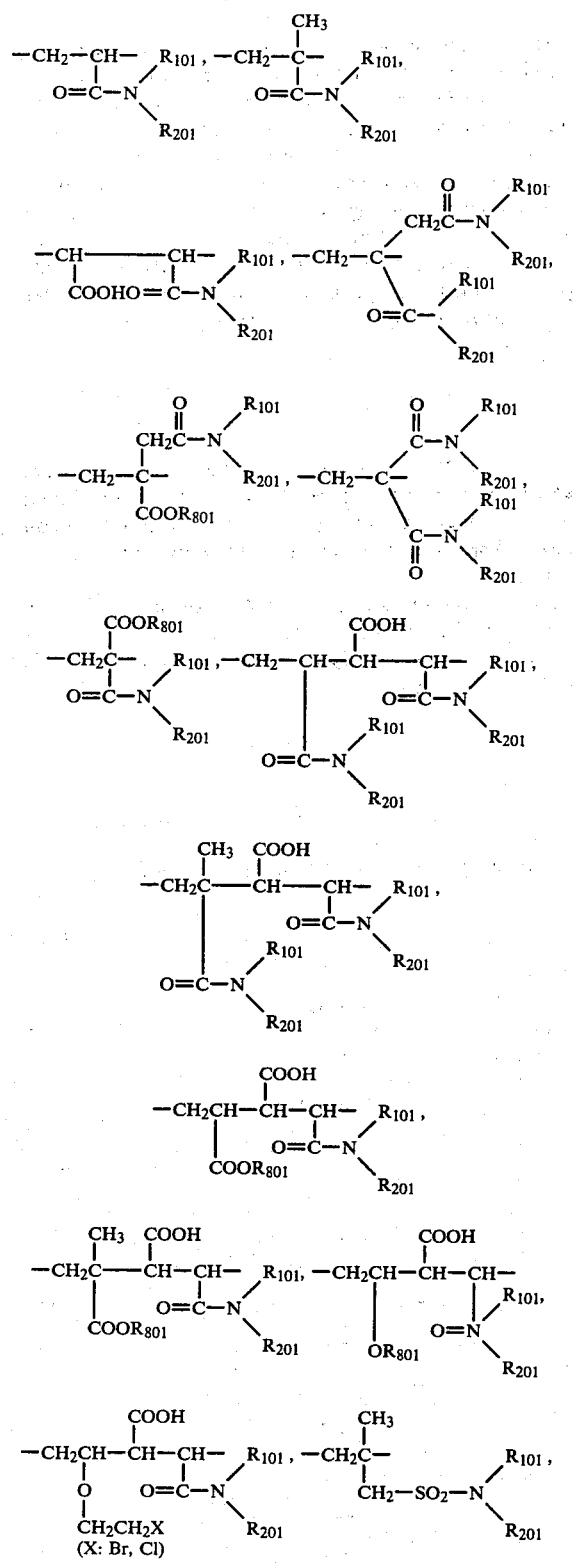

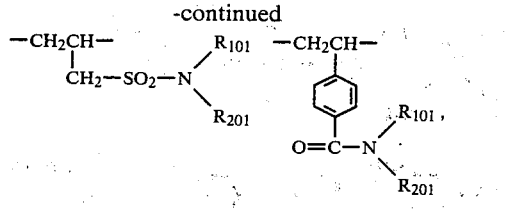

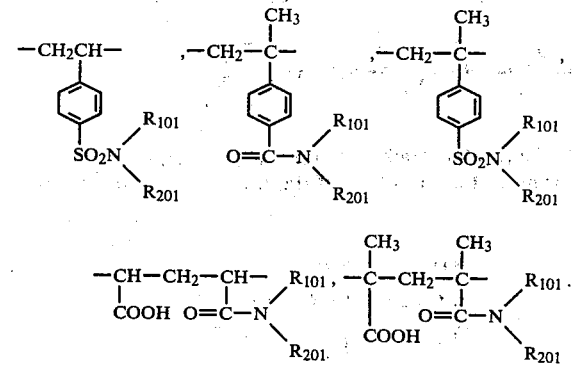

Of the recurring units of formula (I-c), preferred are those of the following formulae

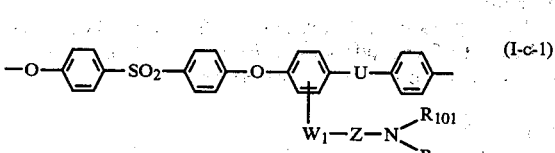  (I-c-1)

and

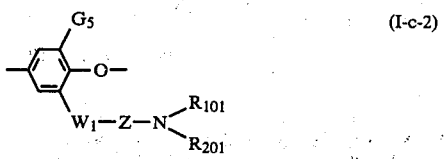  (I-c-2)

wherein $W_1$ represents a hydrogen atom or a methylene group; $G_5$ represents a hydrogen atom, a halogen atom, a methyl group, a trifluoromethyl group, or the group

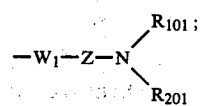

and U, Z, $R_{101}$ and $R_{201}$ are as defined hereinabove.

Typical examples of the recurring unit of formula (I-c-1) or (I-c-2) are as follows:

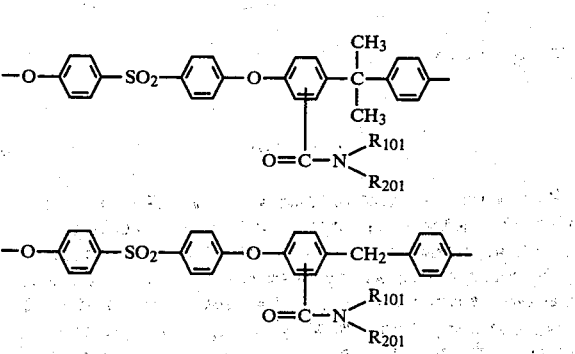

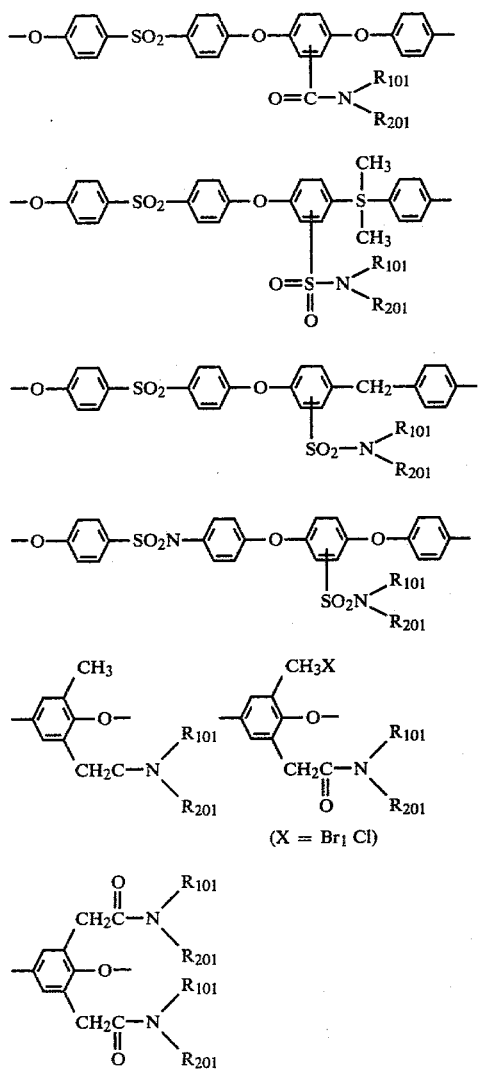

(X = Br, Cl)

The molecular weights of polymers containing these recurring units are not particularly limited, but usually on the order of several thousand to ten times thereof, and their degrees of polymerization are about 20 to about 500, preferably 50 to 300.

Among the recurring units of formula (I), recurring units of formula (I-a-1) derived from vinyl monomers are especially preferred.

The soluble polymer used in this invention may contain at least 30 mole%, preferably at least 50 mole%, more preferably at least 70 mole%, of a recurring unit of formula (I) including formulae (I-a), (I-b), (I-c), (I-d), (I-a-1), (I-b-1), and (I-b-2). Those which are substantially linear are suitable. In the present invention, polymers substantially composed only of the recurring units of formula (I), and copolymers composed of the recurring unit of formula (I) and another monomeric unit copolymerizable with the unit of formula (I) can be used so long as they contain the recurring unit of formula (I) in the molar proportions specified above. The other monomeric units copolymerizable with the recurring unit of formula (I) in the soluble polymer are described hereinbelow.

Polymers containing the recurring unit of formula (I-c) including formulae (I-c-1) and (I-c-2) are desirably composed substantially only of the recurring unit of formula (I-c).

In the present invention, the molecular chain of polymer contains at least 30 mole% of the unit of formula (I). Preferably, the units of formula (I) are distributed as uniformly as possible in the polymer chain.

The recurring unit of formula (I) can be present in the polymer in such a proportion that the amount of "amino groups containing 1 to 2 active hydrogens" present in the group

in the pendant chain (i.e., active amino groups) is at least 0.2 milliequivalent (meq.), preferably 0.5 to 20 meq., more preferably 1 to 20 meq., per gram of the polymer.

Very desirably, the polymer used in this invention should be a soluble polymer which dissolves to some extent in water or water-miscible polar organic solvents in an amount of at least 0.1 g, preferably at least 0.5 g, more preferably at least 1.0 g, at 25° C. per 100 g of water or the organic solvent.

The dissolving of the polymer means not only the complete dissolving of the polymer in molecular form in a given solvent to form a true solution, but also the dispersion of the polymer in the form of a colloid, latex or emulsion which can be coated on a microporous substrate (to be described hereinbelow) to form a coating thereon.

Typical examples of the water-miscible polar organic solvent used to determine the solubility of the polymer include lower alcohols such as methanol, ethanol, n-propanol and iso-propanol, formic acid, dimethylformamide (DMF), dimethylsulfoxide (DMSO), tetramethylenesulfone, and N-methylpyrrolidone (NMP). These organic solvents may contain up to about 10% by weight of water.

The polymer used in this invention is not strictly limited in its molecular weight (degree of polymerization) if it has the solubility specified above and film-forming ability. Generally, the polymer desirably has an inherent viscosity $$\left(\eta_{inherent} = \frac{\ln \eta_{rel.}}{\text{concentration of polymer}}\right)$$

in formic acid at 30° C., of at least 0.1 dl/g, preferably 0.15 to 5.0 dl/g, more preferably 0.2 to 2.0 dl/g (0.5 wt% polymer solution).

The polymer used in this invention usually has a number average molecular weight in the range of about 500 to 1,000,000, preferably about 2,000 to about 200,000.

The soluble polymer used in this invention can be easily formed by reacting a polymer (to be referred to as an "intermediate polymer") containing at least 30 mole% of a recurring unit of the formula

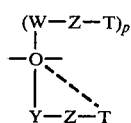 (V)

wherein T represents a halogen atom or an alkoxy, aryloxy, alkenyloxy or aralkyloxy group containing 1 to 20 carbon atoms, or together with Y—Z—Q, represents a 5- or 6-membered cyclic acid anhydride group or cyclic imide group, and Q, W, Y, Z and p are as defined hereinabove, with an amine of the following formula

 (VI)

wherein $R_1$ and $R_2$ are as defined.

The functional group —Y—Z—T in the intermediate polymer containing the recurring unit of formula (V) may be introduced into the polymer after its formation. It is convenient generally, however, to prepare the intermediate polymer by using a monomer having such a functional group from the viewpoint of the ease of controlling the content or position of the functional group.

Thus, known polymers can be used as the intermediate polymer containing the recurring unit of formula (V), or such a polymer can be easily produced by known methods.

A first method for preparing the intermediate polymer containing the recurring unit of formula (V) typically comprises subjecting to addition polymerization in a manner known per se at least one of monomers of the following formulae (VII) which will provide the recurring units of formula (I-a) or (I-d):

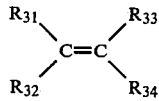 (VII)

wherein $R_{31}$ represents a hydrogen atom or an alkyl group containing 1 to 5 carbon atoms;

$R_{32}$ and $R_{33}$, independently from each other, represent a hydrogen atom, an alkyl group containing 1 to 5 carbon atoms, the group —W—Z—$T_1$, the group

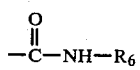

or the group —$R_7$—COO$R_8$, $R_{34}$ represents the group —Y—Z—$T_1$ or together with $R_{32}$, represents the group

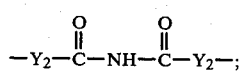

or the group

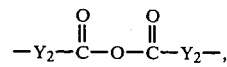

$T_1$ represents a halogen atom, or an alkoxy, aryloxy, aralkyloxy or alkenyloxy group containing 1 to 2 carbon atoms;

$Y_2$ represents a direct bond or an alkylene group containing 1 to 2 carbon atoms; and W, Y, Z, $R_6$, $R_7$ and $R_8$ are as defined hereinabove, and

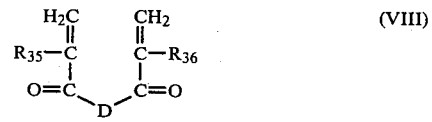 (VIII)

wherein $R_{35}$ and $R_{36}$, independently from each other, represent a hydrogen atom or a methyl group; and D represents —O— or —NH—; or comprises copolymerizing at least one of these monomers with another monomer copolymerizable therewith in a manner known per se.

Specific examples of monomers of formulae (VII) and (VIII) are given below.

(i) Alpha, beta-unsaturated dicarboxylic acid anhydrides such as maleic anhydride, itaconic anhydride, acrylic anhydride, methacrylic anhydride and vinylphthalic anhydride.

(ii) Alpha, beta-unsaturated mono- or di-carboxylic acids such as acrylic acid, methacrylic acid, maleic acid, fumaric acid and vinylbenzoic acid.

(iii) $C_1$–$C_6$ alkyl esters and $C_6$–$C_{15}$ aryl esters of alpha, beta-unsaturated mono- or di-carboxylic acids such as ethyl acrylate, ethyl methacrylate, dimethyl fumarate, methyl maleate, dimethyl maleate, phenyl acrylate, methyl vinylbenzoate and ethyl vinylbenzoate.

(iv) Alpha, beta-unsaturated sulfonic acids and salts thereof, such as allylsulfonic acid, sodium allylsulfonate, methallylsulfonic acid, sodium methallylsulfonate, styrene-sulfonic acid, and sodium styrenesulfonate.

Of these vinyl monomers, the unsaturated carboxylic acid anhydrides (i) and the esters of unsaturated carboxylic acids (iii) are preferred. Polymers or copolymers derived from maleic anhydride, itaconic anhydride, ethyl acrylate, methyl methacrylate and acrylic anhydride are especially preferred.

It is possible to convert the polymer of the vinyl monomer after polymerization into the functional group —Y—Z—T, and use it for reaction with an amine. For example, acrylic acid or methacrylic acid, after polymerization, can be converted into a polymer having a cyclic acid anhydride group partly with a structure similar to a cyclic polymer of acrylic anhydride or methacrylic anhydride by causing a suitable dehydrating agent to act on the resulting polymer. Alternatively, by the action of an acid halide, the polymer of the vinyl monomer can be converted to a polymer similar to a polymer prepared from acryloyl chloride or methacryloyl chloride as a starting material.

Likewise, as required a monomer having a sulfo group (—SO$_3$H) or a sulfonate group (—SO$_3$M), in which M is an alkali metal), after polymerization, may be converted to a polymer having a sulfonyl halide group (—SO$_2$X) or sulfonyl ester group, and then reacted with an amine.

Polyacrylonitrile, for example, can be converted by hydrolysis to polyacrylic acid although acrylonitrile is not included with the aforesaid group of vinyl monomers. Thus, it should be understood that those monomers which are not included within the aforesaid group of monomers but which afford polymers equivalent to the polymers of the above-exemplified monomers by a polymer reaction can also be used.

The other monomer copolymerizable with the vinyl monomer of formula (VII) or (VIII) above may be selected from a wide range of radical polymerizable monomers which copolymerize with the vinyl monomer in the presence of a radical initiator to form soluble polymers difined hereinabove.

Such a radical polymerizable comonomer generally includes:

(1) monomers containing up to 3, preferably 1 or 2, carbon-carbon ethylenically unsaturated bonds of the vinyl, vinylene, vinylidene or (meth)allyl type (to be referred to as ethylenic comonomers), and (2) monomers not containing such an ethylenically unsaturated bond but copolymerizable with the vinyl monomer of formula (VII) or (VIII) (to be referred to as non-ethylenic comonomers), such as SO$_2$.

They can be used either singly or mixed with each other. The monomers (2) are useful, for instance, as a monomeric component which gives the unit —SO$_2$— in formula (I-b) given hereinabove.

Suitable ethylenic comonomers of type (1) contain at most 20 carbon atoms, preferably 2 to 15 carbon atoms, more preferably 4 to 10 carbon atoms, and a molecular weight of 28 to 300, especially 50 to 250. Desirably, the ethylenic comonomers generally have a solubility, in water or a lower alcohol such as methanol, ethanol or propanol at 25° C., of at least 0.5 g, preferably at least 1 g, more preferably at least 5 g, per 100 g of such a solvent.

The ethylenic comonomer (1) is preferably selected from the following compounds (a) and (b).

(a) Compounds of the following formula

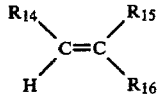
(III-1)

wherein

R$_{14}$ represents a hydrogen atom or an alkoxycarbonyl group with the alkyl moiety containing 1 to 10 carbon atoms;

R$_{15}$ represents a hydrogen or halogen atom or a methyl group,

R$_{16}$ represents a hydrogen or halogen atom, an alkoxy group containing 1 to 10 carbon atoms optionally substituted by a hydroxyl group and/or a halogen atom, an alkoxycarbonyl group with the alkyl moiety containing 1 to 10 carbon atoms, an alkanoyl group containing 1 to 10 carbon atoms, an alkanoyloxy group containing 1 to 10 carbon atoms, an alkyl group containing 1 to 10 carbon atoms substituted by the group —SO$_3$M or hydroxyl group, a phenyl group optionally substituted by the group —SO$_3$M or a methyl group, a glycidyloxy group, or a group of the formula —B-O)$_j$H in which B represents an ethylene or propylene group, and j is an integer of 1 to 8;

R$_{14}$ and R$_{15}$, together, may represent an ethylenedioxy group; and

M represents an alkali metal.

(b) Compounds of the following formula

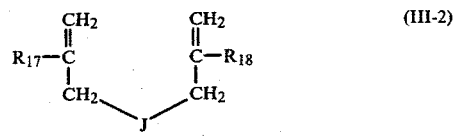
(III-2)

wherein

R$_{17}$ and R$_{18}$, independently from each other, represent a hydrogen atom or a methyl group;

J represents an oxygen atom or a group of the formula

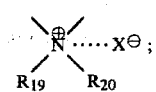

R$_{19}$ and R$_{20}$, independently from each other, represent a hydrogen atom or an alkyl group containing 1 to 10 carbon atoms; and X$^\ominus$ represents an anion such as halogen ions, HSO$_4^\ominus$, NO$_3^\ominus$, HCOO$^\ominus$ and H$_3$C.COO$^\ominus$.

Typical examples of comonomers represented by the above formulae (III-1) and (III-2) are given below.

(1) Aliphatic olefins

CH$_2$=CH$_2$, CH$_2$=CH . CH$_3$, CH$_2$=CH . CH$_2$ . CH$_3$,

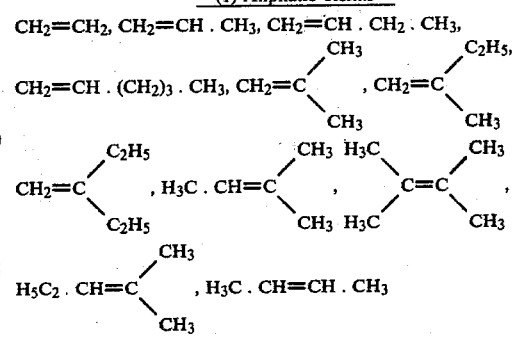

(2) Hetero atom-containing aliphatic olefins

CH$_2$=CH . CN, CH$_2$=C(CH$_3$) . CN, CH$_2$=CH . COON,
CH$_2$=CHOCH$_3$, CH$_2$=CHOC$_2$H$_5$, CH$_2$=CHOC$_2$H$_4$Cl,
CH$_2$=C(CH$_3$) . COOH, CH$_2$=CHCl,
CH$_2$=CHF, CH$_2$=C(Cl)$_2$,
CH$_2$=CF$_2$, CH$_2$=CH . SO$_3$H, CH$_2$=CH . CH$_2$ . SO$_3$H,
CH$_2$=CH . CH$_2$ . SO$_3$Na, CH$_2$=C(CH$_3$) . CH$_2$ . SO$_3$Na, $$CH_2=CH . \overset{O}{\underset{\|}{C}} . N(CH_3)_2, CH_2=CH . \overset{O}{\underset{\|}{C}} . N(C_2H_5)_2,$$

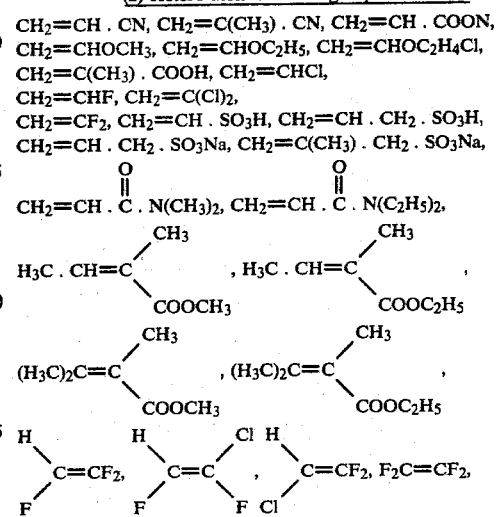

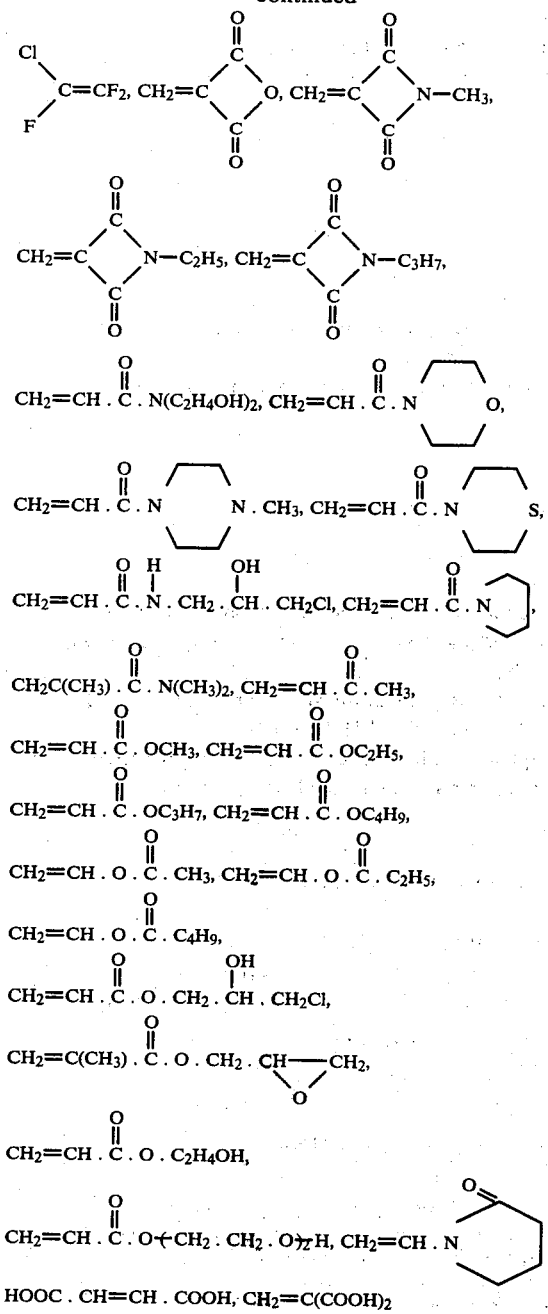

(3) Alicyclic olefins

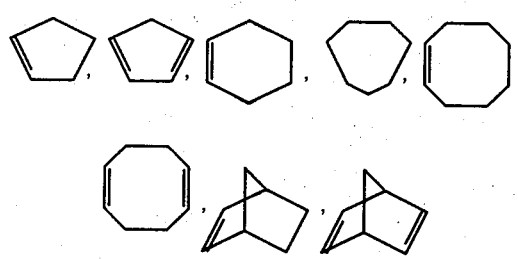

(4) Heterocyclic olefins (5) diallyl compounds

The aforesaid comonomers should be used such that after the amine modifying treatment to be described, the resulting copolymer should have an active amino group content of at least 0.5 milliequivalent per gram of the copolymer.

Generally, the proportion of the comonomer is up to 70 mole%, preferably 10 to 50 mole%.

Among the comonomers (1) to (5) above, ethylvinyl ether, methylvinyl ether, chloroethylvinyl ether, styrene and styrenesulfonic acid are preferred as comonomers to be copolymerized with maleic anhydride and (meth) acrylate esters.

A second method for preparing the intermediate polymer having the recurring unit of formula (V) comprises radical-copolymerization of a monomer of the following formula which will provide the recurring unit of formula (I-b)

(I-b-1)

wherein E and $R_{801}$ are as defined hereinabove, with sulfur dioxide. The polymerization can be easily carried out by a known method (e.g., the method described in Japanese Patent Publication No. 14587/66) in a polar solvent such as dimethylsulfoxide in the presence of a radical initiator such as a persulfate.

A third method for preparing the intermediate polymer having the recurring unit of formula (V) comprises introducing the group —Y—Z—T (and —W—Z—T) into the corresponding precursor having no group —Y—Z—T (and —W—Z—T). This method is especially effective for providing a soluble polymer having the recurring unit of formula (I-c) including formulae (I-c-1) and (I-c-2).

According to this method, a carboxyl group, or a sulfo group, or a reactive derivative of such a group can be introduced in a manner known per se into an aromatic polymer composes substantially only of a recurring unit of the following formula which corresponds to formula (I-c):

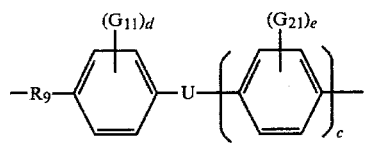

(I-c-1)

wherein $G_{11}$ and $G_{21}$, independently from each other, represent a halogen atom, an alkyl group containing 1 to 3 carbon atoms, or a haloalkyl group containing 1 to 3 carbon atoms, and $R_9$, U, c, d and e are as defined hereinabove.

Specific examples of the recurring unit of the aromatic polymer are given below.

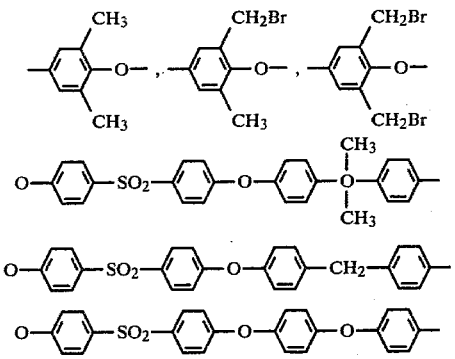

As stated above, the molecular weight of this polymer is on the order of several thousand to 10 times thereof, and therefore, their degrees of polymerization are about 20 to 500, preferably 50 to 300.

Introduction of a carboxyl group, a sulfo group or a reactive derivative of such a group into these aromatic polymers can be carried out by various methods, such as sulfonation of the aromatic ring, Friedel-Crafts acylation of the aromatic ring and subsequent hydrolysis, and the halogenation of the aromatic ring, followed by cyanation and carboxylation. These functional groups provide reaction sites in the amine modifying reaction to be described hereinbelow. Thus, the suitable content of such a functional group is at least 0.5 milliequivalent to 20 milliequivalents, preferably 1 to 20 milliequivalents, per gram of the polymer.

The intermediate polymer prepared in the above manner is then converted to a soluble polymer containing the recurring unit of formula (I) by treating it together with the amine of formula (VI).

The amines exemplified hereinabove as the polyamino compound can also be used as the amines of formula (VI).

The amine compound of formula (VI) is reacted with the intermediate polymer to impart moderate hydrophilicity and solubility to the polymer, and also provides a crosslinking site for a crosslinking reaction to be described hereinbelow. Accordingly, such a polyamino compound preferably has as many amino groups per molecule as possible. However, the use of a polyamino compound having too high a molecular weight tends to cause gellation in the amine modification of the aforesaid intermediate polymer.

Furthermore, if the number of amino groups is too large, many unreacted amino groups will remain in the cross-linked polymer formed by the crosslinking reaction to be described hereinbelow. This undesirably causes a reduction in the oxidation resistance of the polymer.

From the standpoint of the oxidation resistance of the final membrane, suitable amino compounds are piperazine, alkyl-substituted piperazine and N,N'-dialkyl-substituted ethylene-diamine.

Preferably, such an amine modification reaction is carried out as quantitatively as possible so long as gellation owing to an intermolecular reaction does not take place.

One example of the amine modifying reaction of the intermediate polymer is schematically shown as follows:

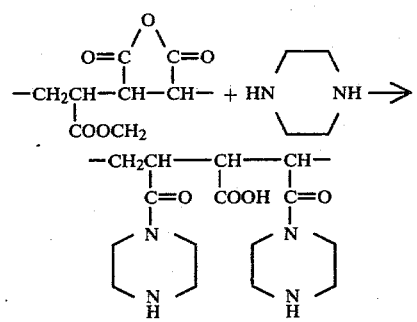

To avoid gellation in this amine modifying reaction, it is preferable to carry out the reaction in a dilute solution of the polyamino compound. Usually, by adding the intermediate polymer to a polyamine solution having a concentration of 1 to 20% by weight, preferably 5 to 10% by weight, and carrying out the reaction at a relatively mild temperature range, preferably at room temperature 50° C., the amine modification is achieved without involving gellation.

The reaction solvent for the amine modification reaction may be any solvent which does not easily react with the intermediate polymer to be modified with the amine, and the polyamine compound. In view of the solubilities of the starting material and the product, and the ease of post-treatment, suitable solvents are water, ethers such as tetrahydrofuran and dioxane, alcohols such as methanol, ethanol and propanol, and aromatic hydrocarbons such as benzene and toluene. Water, methanol and ethanol are preferred, and water is most preferred.

The amount of the polyamino compound used in the amine modifying reaction is not critical, and can vary as desired, according to its type, etc. Generally, the suitable amount of the polyamino compound is 0.5 to 1.5 moles, especially 0.8 to 1.2 moles, per equivalent of the reactive groups (—Y—Z—T and —W—Z—T) contained in the intermediate polymer. If the amount of the polyamino compound is less than 0.5 mole per equivalent of the reactive groups in the intermediate polymer, gellation will occur during the amine modifying reaction, or a semipermeable membrane obtained after the crosslinking reaction to be described hereinbelow will tend to have a reduced water flux. On the other hand, when the amount of the polyamino compound exceeds 1.5 moles per equivalent of the reactive groups, the unreacted amino groups will undesirably cause a reduction in the strength and salt rejection of a semipermeable membrane obtained after the crosslinking reaction.

The amine-modified amino-containing soluble polymer is used for the formation of a membrane either as such or after diluting the reaction mixture, or after isolating and purifying the reaction mixture.

According to another procedure, the soluble polymer containing the recurring unit of formula (I) may be prepared from a monomer having the groups

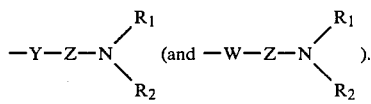

This method is especially useful for vinyl monomers, and is performed by the direct radical polymerization of an amine-modified vinyl monomer obtained by reacting a vinyl monomer having an atom or functional group capable of reacting with an active amino group with the polyamino compound

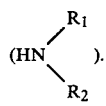

or it can be carried out by reacting the active amino groups contained in the group

in the amine-modified monomer with an inorganic acid to form an amine salt, radical-polymerizing the amine salt, and neutralizing the product with a base. Preparation of a polymer by the above method is schematically shown below for easy understanding.

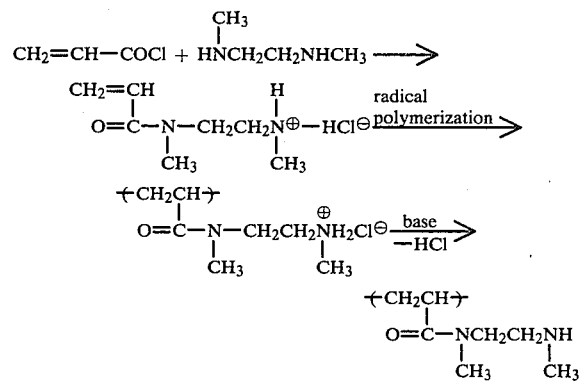

Thus, suitable base polymers used to make the semipermeable membrane in accordance with this invention include not only (I) polymers composed substantially only of the recurring units of formula (I), but also (II) copolymers described below.

Suitable copolymers for use in this invention are composed of (A) at least 30 mole%, preferably at least 50 mole%, more preferably at least 70 mole%, of the recurring unit of formula (I-a), (I-b) or (I-c), and (B) up to 70 mole%, preferably up to 50 mole%, more preferably up to 30 mole%, of at least one recurring unit selected from those of the following formula

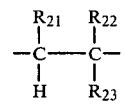

wherein $R_{21}$ represents a hydrogen atom or an alkoxy-carbonyl group with the alkyl moiety containing 1 to 10 carbon atoms;

$R_{22}$ represents a hydrogen or halogen atom or a methyl group;

$R_{23}$ represents a hydrogen or halogen atom, an alkoxy group containing 1 to 10 carbon atoms optionally mono- or di-substituted by a hydroxyl group and/or a halogen atom, an alkoxycarbonyl group with the alkyl moiety containing 1 to 10 carbon atoms, an alkanoyl group containing 1 to 10 carbon atoms, an alkanoyloxy group containing 1 to 10 carbon atoms, an alkyl group containing 1 to 10 carbon atoms mono-substituted by the group —SO$_3$M or a hydroxyl group, a phenyl group optionally mono-substituted by the group —SO$_3$M or a methyl group, a glycidyloxy group, a group of the formula —B-C)$_j$H in which B represents an ethylene or propylene group and j is an integer of 1 to 8, the group

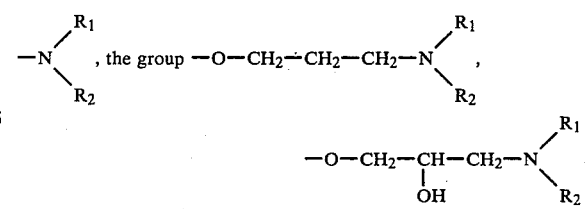

in which $R_1$ and $R_2$ are defined hereinabove;

$R_{21}$ and $R_{22}$ together may represent an ethylenedioxy group;

$R_{22}$ and $R_{23}$ together may represent

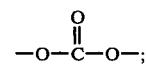

and M represents an alkali metal; and those of the following formula

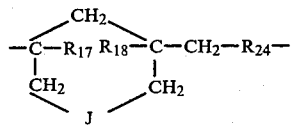

wherein $R_{17}$, $R_{18}$ and J are as defined with regard to formula (III-a), and $R_{24}$ represents a direct bond or —SO$_2$—.

Typical examples of especially suitable soluble polymers containing the recurring units of formula (I) are given below. These examples are for the purpose of facilitating the understanding of the invention, and are in no way intended to limit the scope of this invention.

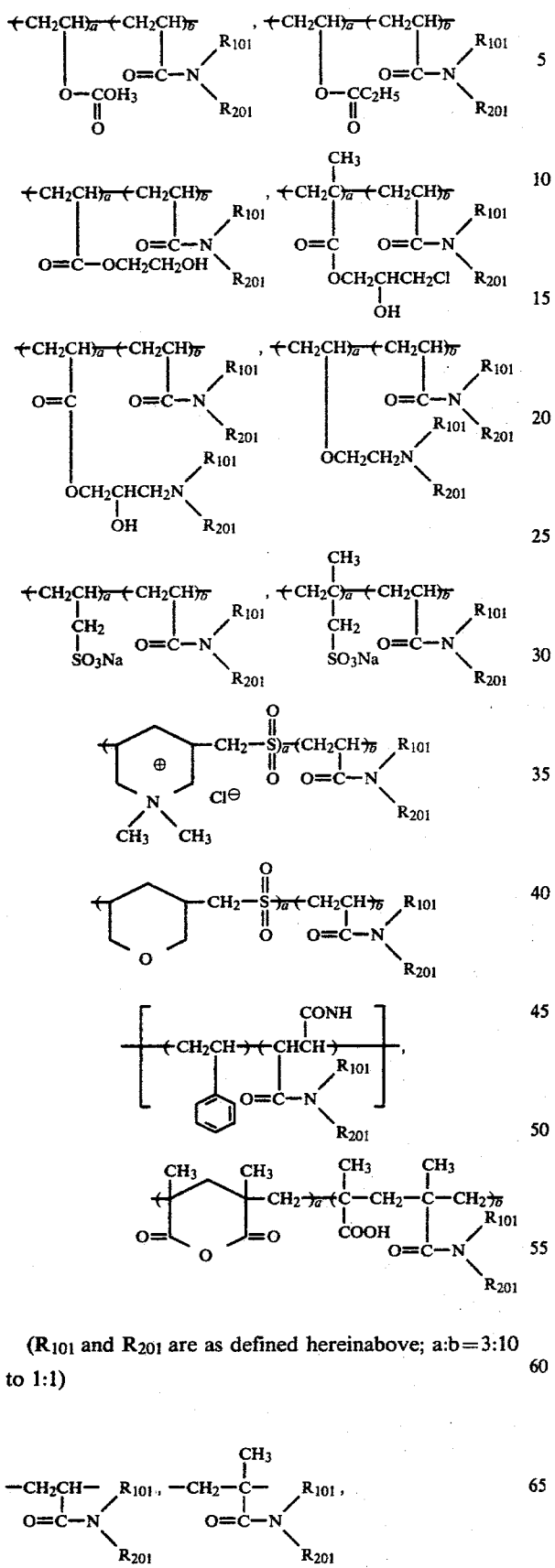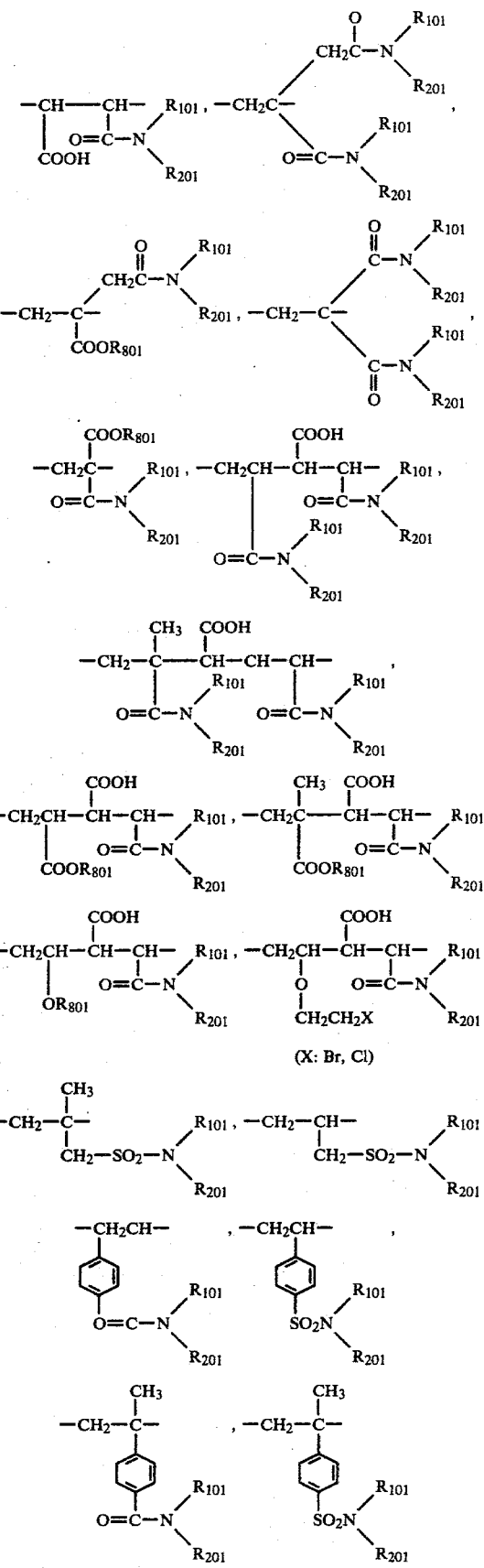
($R_{101}$ and $R_{201}$ are as defined hereinabove; $a:b = 3:10$ to $1:1$)
(X: Br, Cl)

-continued

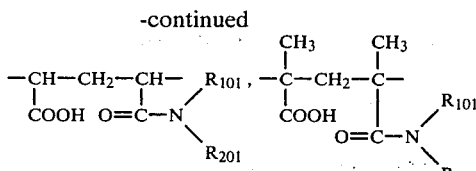

The aforesaid polymers can be used singly, or as a mixture with each other.

So long as the objects of this invention can be achieved, the polymer having the unit of formula (I) can be used as a blend with another polymer. Such other polymer includes those which have the ability to form a water-soluble or aqueous emulsion, and form a polymeric alloy as a whole after blending with the polymer having the unit of formula (I) and the crosslinking of the polymer having the unit (I), and which even when the water-soluble polymer is not crosslinked, can by themselves become substantially insoluble. The proportion of such a polymer varies according to the proportion of the structural unit of formula (I) in the above polymer. It should, however, be such that in the resulting blend, the proportion of the structural unit of formula (I) is at least 50 mole%. If the proportion of the other polymer is too high, it is difficult to form a polymeric alloy. Hence, the other polymer is blended usually in an amount of not more than 30 parts by weight, preferably not more than 10 parts by weight, per 100 parts by weight of the polymer having the unit (I).

Use of such a polymer blend makes it possible also to control the flexibility and hydrophilicity of the resulting composite membrane.

Examples of the other polymer having the aforesaid properties include polyvinyl alcohol, polyvinyl pyrrolidone, poly(sodium acrylate), poly(sodium methacrylate), polyvinyl methyl ether, polyvinyl ethyl ether, a copolymer of methyl vinyl ether and maleic anhydride, a copolymer of vinyl acetate and ethylene, polyvinyl acetate and partially hydrolyzed products of these polymers.

To produce the semipermeable composite membrane of the invention from the polymer containing the recurring unit of formula (I), it is necessary to crosslink the polymer while it is deposited on at least one side of a microporous substrate.

Deposition of the polymer on the microporous substrate can be effected by applying a solution of the base polymer containing the recurring unit of formula (I) to the substrate.

The solvent for the preparation of the solution of the base polymer may be those which do not substantially dissolve or swell a substrate to which the solution is applied. Specific examples include water, lower alcohols, acetone, tetrahydrofuran, dimethylsulfoxide, N-methylpyrrolidone, dimethylformamide, dimethylacetamide and a mixture of at least two of these compounds. Of these, water and aqueous mixtures of these consisting mainly of water are preferred.

The concentration of the base polymer in the solvent is not critical, and can be varied widely depending upon the type and viscosity of the polymer, etc. Generally, it is advantageous to use the polymer in a concentration of at least 0.05% by weight, preferably 0.07 to 10% by weight, more preferably 0.1 to 5% by weight, based on the weight of the solution.

The base polymer is deposited in the form of thin film on the microporous substrate before crosslinking. This deposition can be performed in quite the same manner, as a conventional method disclosed, for example, in the above-cited U.S. Patents. For example, the thin film can be formed in situ upon the microporous substrate or it can be formed separately, as by a flotation-deposition method.

Substrates that can be used may be any of the types conventionally used in a reverse osmosis process. They include porous glass, sintered metals, ceramics, and organic polymeric materials such as cellulose esters, styrene resins, vinyl butyral resins, polysulfone, chlorinated polyvinyl chloride, etc. described in U.S. Pat. No. 3,676,203. Polysulfone film has been found to be a particularly effective support material for the membranes of the invention, and chlorinated polyvinyl chloride is another very effective support material. Preparation of polysulfone microporous substrate is described in Office of Saline Water Research and Development Progress Report No. 359, Oct., 1968.

These substrates preferably have a surface pore size of generally 100 to 1000 Å, but are not limited to these specific sizes. Depending upon the use of the final membrane product, surface pores ranging in size from about 50 Å to about 5000 Å may be acceptable.

The substrate may be of an isotropic structure or an anisotropic structure, desirably of the latter structure. When the membrane constant of the substrate is less than $10^{-4}$ g/cm$^2$.sec.atm, the water permeability of the substrate is too low, and when it is more than 1 g/cm$^2$.sec.atm, the salt rejection tends to be extremely low. Accordingly, preferred membrane constants are 1 to $10^{-4}$ g/cm$^2$.sec.atm, and the best results are obtained with a membrane constant of $10^{-1}$ to $10^{-3}$ g/cm$^2$.sec.atm. The term "membrane constant", as used herein, denotes the amount of pure water which permeates the membrane under a pressure of 2 kg/cm$^2$, and is expressed in g/cm$^2$.sec.atm.

Preferably, the substrate used is reinforced at its back with a woven or non-woven cloth, etc. Examples of the woven or non-woven cloth are those of polyethylene terephthalate, polystyrene, polypropylene, nylon or vinyl chloride resins.

When it is desired to form a thin film of the base polymer in situ on the microporous substrate, the microporous substrate is treated with a solution of the base polymer. The treatment can be performed by coating at least one surface of the substrate with a solution of the base polymer by a suitable method such as solution casting, brush coating, spraying, wig coating or roll coating; or by immersing the substrate in a solution of the base polymer.

The substrate so treated by coating or immersion is then subjected to a drain treatment. The drain treatment can be carried out generally at room temperature for 1 to 30 minutes, preferably 5 to 20 minutes. As a result, a substrate is obtained which has formed thereon a thin layer of the polymer solution with a suitable thickness that can vary according to the concentration of the polymer in the polymer solution. Usually, a thin film material of the base polymer having a total thickness of about 1,000 to about 50,000 Å, preferably about 2,000 to about 10,000 Å, is deposited on the surface of the substrate.

The substrate on which the base polymer has been deposited can be directly subjected to a crosslinking treatment.

The substrate having the thin film deposited on the support is then subjected to a crosslinking treatment by using a polyfunctional compound containing at least two functional groups capable of reacting with the active amino group to crosslink the thin film material of the base polymer on the substrate.

The crosslinking reaction is effected by an interfacial reaction between the surface of the film material of the base polymer and the polyfunctional compound to produce a thin film having permselectivity on the surface of the substrate. Since the main purpose of the polyfunctional compound is to provide an interfacial reaction substantially concentrated on or confined to the surface of the film of the base polymer, the polyfunctional compounds should be preferably selected in accordance with the principles of interfacial reaction. For example, when the base polymer film is coated from an aqueous solution, the polyfunctional compound or polyfunctional compound solution should be substantially insoluble in water. For this and other reasons, various polyfunctional compounds compatible with non-polar organic solvents such as hydrocarbons but substantially insoluble in water are preferred. Selection of the polyfunctional compounds is also governed by empirical conditions, e.g. the salt rejection and flux properties or resistance to compaction of the ultimately obtained membrance, and the selection can be achieved easily by any one skilled in the art by performing small-scale routine experiments.

The functional groups of the polyfunctional compounds that can be used in this invention are either one of acid halide groups (—COX), sulfonyl halide groups (—SO$_2$X), N-haloformyl groups (>N—COX), haloformate groups (—OCOX), isocyanate groups (—NCO) and acid anhydride groups

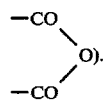

At least two, preferably 2 or 3, of these functional groups can be contained per molecule.

In addition to compounds having such functional groups, cyanuric acid chloride of the following formula

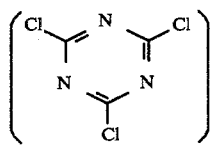

can also be used in this invention as the polyfunctional compounds.

Preferred functional groups are acid halide, sulfonyl halide and acid anhydride groups, the first two being especially preferred. Another suitable functional group is an isocyanate group. Two or more functional groups present in one molecule may be of the same type or of different types. The polyfunctional compounds generally have a cyclic structure, and may be aromatic, heterocyclic or alicyclic. For the purpose of the present invention, aromatic polyfunctional compounds have been found to be especially effective.

Any mononuclear or polynuclear (especially, binuclear) aromatic polyfunctional compounds having at least two, preferably two or three, functional groups bonded to the aromatic ring and 6 to 20, preferably 6 to 15, carbon atoms can be suitably used in the present invention. Preferably, the aromatic ring or rings should not contain a substituent other than the above functional groups. However, one or two groups which do not substantially affect the crosslinking reaction, such as lower alkyl groups, lower alkoxy groups or halogen atoms, may be present on the aromatic ring.

An especially desirable group of the aromatic polyfunctional compounds includes those of the following formula

wherein Ar represents a benzene ring, a naphthalene ring, or the ring

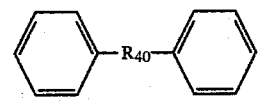

in which R$_{40}$ represents

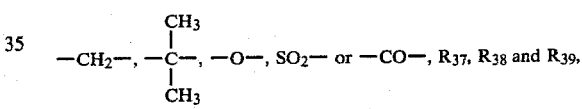

independently from each other, represent an acid halide, sulfonyl halide, isocyanate, N-haloformyl or haloformate group, especially the first three groups; or R$_{37}$ and R$_{38}$ together represent an acid anhydride group; it is especially desirable that R$_{37}$, R$_{38}$ and R$_{39}$ be selected from acid halide and sulfonyl halide groups. Typical examples of the aromatic polyfunctional groups are shown below.

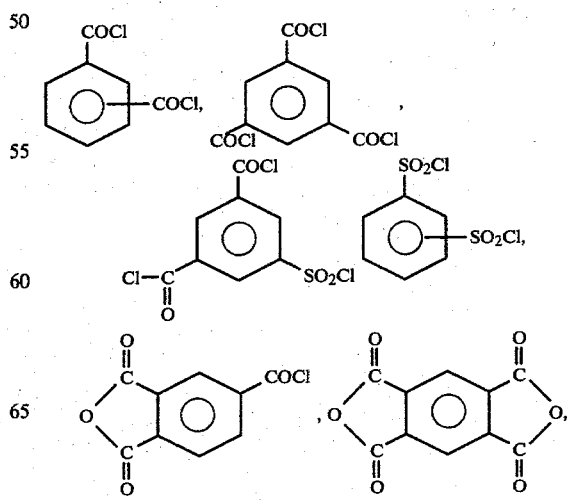

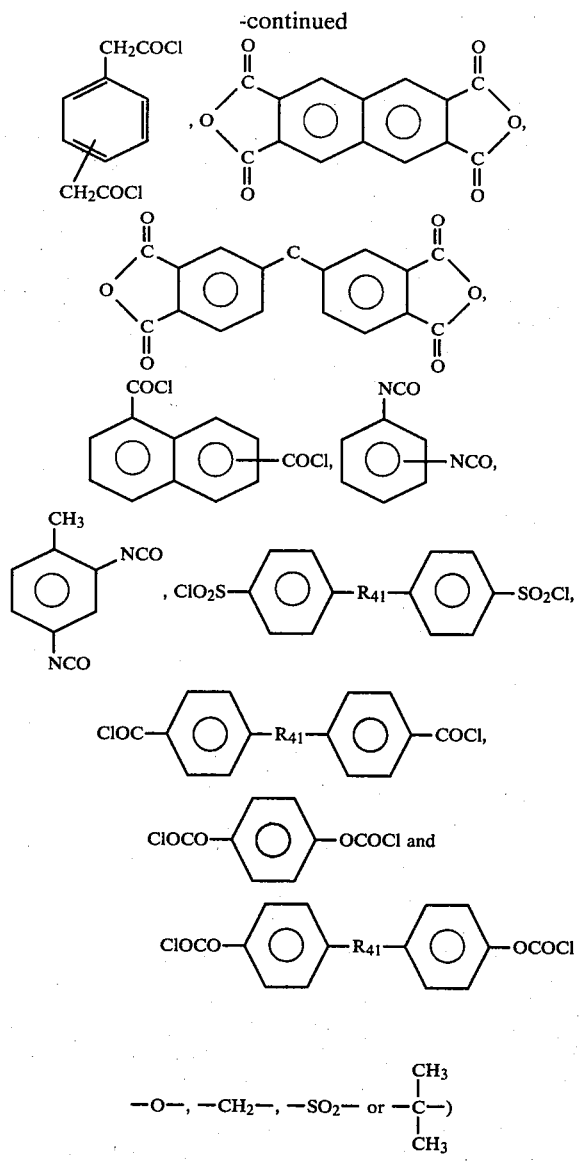

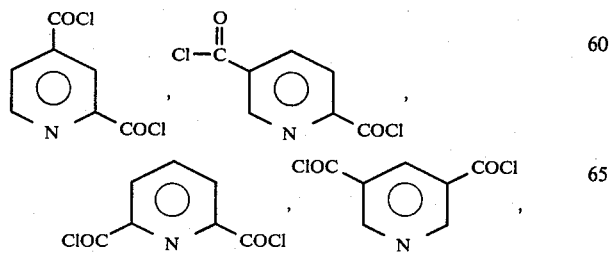

Especially advantageous aromatic polyfunctional compounds are isophthaloyl chloride, terephthaloyl chloride, trimesoyl chloride and 3-chlorosulfonyl-isophthaloyl chloride.

Preferred heterocyclic polyfunctional compounds that can be used in this invention are 5- or 6-membered heteroaromatic or heteroalicyclic compounds having two or three functional groups bonded to the heterocyclic ring and containing 1 to 2 nitrogen, oxygen or sulfur atoms as heteroatoms. Examples are as follows:

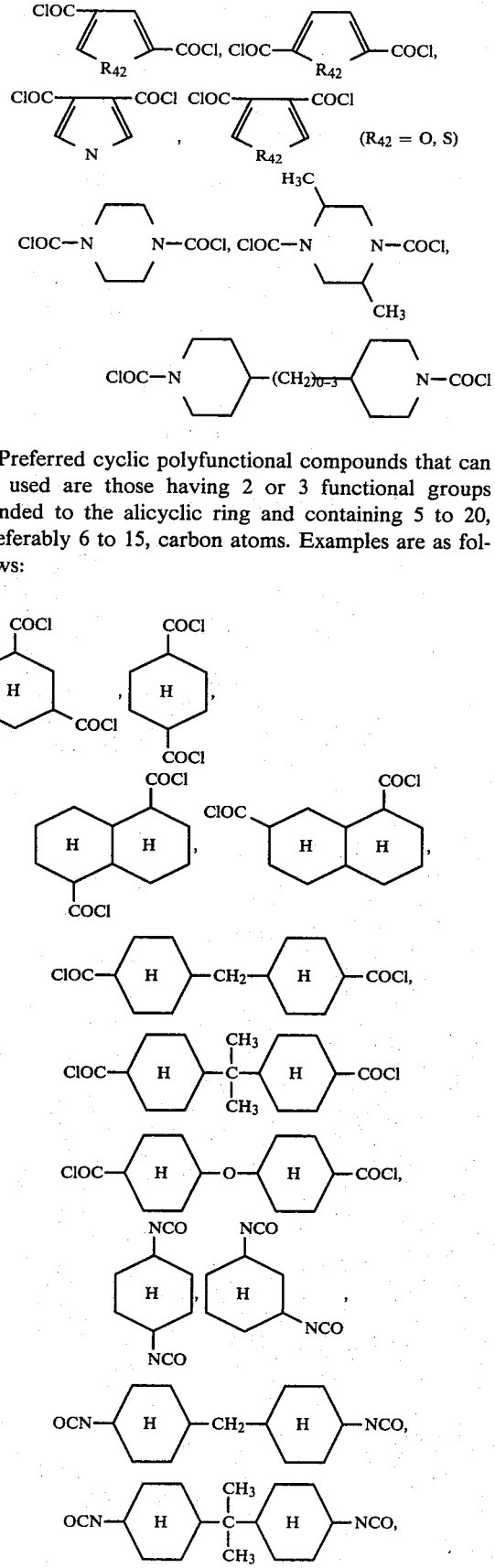

Preferred cyclic polyfunctional compounds that can be used are those having 2 or 3 functional groups bonded to the alicyclic ring and containing 5 to 20, preferably 6 to 15, carbon atoms. Examples are as follows:

-continued

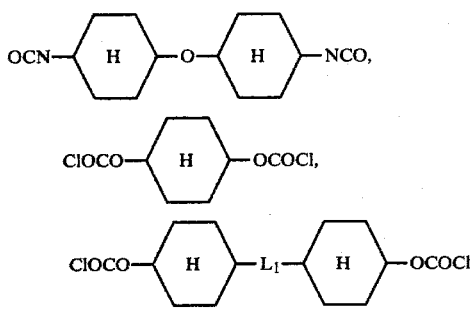

(L₁ represents a direct bonding,

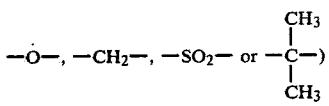

Preferred aliphatic polyfunctional compounds that can be used are those having 2 functional groups and containing 5 to 20, preferably 6 to 15, carbon atoms. Examples are as follows:

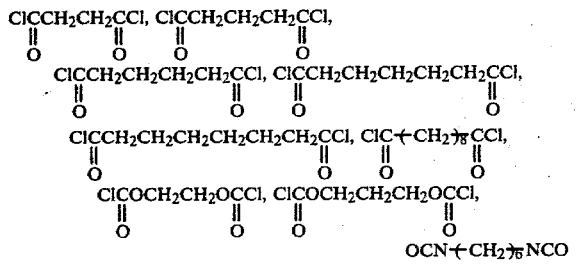

The aromatic heterocyclic or alicyclic polyfunctional compounds can be used either alone or as a mixture of two or more.

It has been found that the salt rejecting and/or flux properties of the finally obtained membrane can be improved by using trifunctional compounds rather than difunctional ones when they are used singly, and by using a combination of a difunctional compound and a trifunctional compound when they are used in combination. Thus, especially preferred polyfunctional compounds to be used in the present invention are trifunctional aromatic compounds; and mixtures of difunctional aromatic compounds and trifunctional aromatic compounds. When a mixture of a difunctional compound and a trifunctional compound is used, the mixing ratio between them is not critical. Generally, the weight ratio of the difunctional compound to the trifunctional compound is from 10:1 to 1:3, preferably from 5:1 to 1:1.

The crosslinking of the film material of the base polymer can be performed usually by contacting the film with a solution of the polyfunctional compound. The solvent used to dissolve the polyfunctional compound should not substantially dissolve the base polymer and the substrate material, and includes hydrocarbons such as n-hexane, n-heptane, n-octane, cyclohexane, n-nonane and n-decane. The optimal concentration of the polyfunctional compound in the solvent may vary considerably depending upon the specific compound, solvent, substrate, etc., and is best determined experimentally. However, concentration of about 0.5 to 5.0, preferably about 1.0 to 3.0% by weight are generally satisfactory.

Conveniently, the crosslinking is accomplished on the interface between the film and the solution by immersing the film in the solution of the polyfunctional compound. In order to promote this crosslinking reaction, it is possible to include a crosslinking accelerator into the film of the base polymer. This accelerator serves to help the polyfunctional compound diffuse into the polymer, and/or to capture hydrogen halide released at the time of crosslinking reaction. Such an accelerator may include, for example, soluble basic compounds and surface-active agents.

Advantageously, suitable soluble basic compounds have a solubility in water or a lower alcohol such as methanol, ethanol or propanol or a mixture thereof of at least 0.1 g, preferably at least 0.2 g, more preferably at least 0.5 g, per 100 g of water, the lower alcohol or a mixture thereof at 25° C. As such compounds, inorganic basic compounds and organic basic compounds having the above solubility can be mentioned. Any inorganic basic compounds having the above-mentioned solubility can be used. The organic basic compounds should desirably have a pka value of generally 5 to 12, preferably 8 to 12.

Examples of the soluble basic compounds are (1) inorganic bases such as sodium hydroxide, potassium hydroxide, lithium hydroxide, sodium carbonate, lithium carbonate, potassium carbonate, sodium bicarbonate, potassium bicarbonate, lithium bicarbonate, sodium phosphate ($Na_3PO_4$) and potassium phosphate ($K_3PO_4$); and (2) organic bases such as triethylamine, trimethylamine, diazabicyclo[2,2,2]octane, hexamethylenetetramine, ethylenediamine, triethylenetetramine, methylamine, ethylamine, triethanolamine, diethanolamine, pyridine, N,N-dimethylaniline, N-methylpiperidine, and N-methylpyrrolidine.

These basic compounds capture hydrogen halide, which may be formed by the crosslinking reaction to promote the crosslinking reaction, positively participate in the crosslinking reaction itself, and also have the effect of improving the mechanical strength or oxidation resistance of the resulting semipermeable membrane. They are especially suitable as crosslinking accelerators.

The basic compound is used in an amount of generally 0.5 to 2.0 moles, preferably 0.7 to 1.2 moles, per equivalent of the active amino group in the polymer.

The interfacial crosslinking reaction between the surface of the film and the polyfunctional agent can be carried out at about −10° C. to about 100° C., preferably 20° C. to 50° C., for a period of 10 seconds to 30 minutes, preferably 30 seconds to 10 minutes. This interfacial reaction can be performed so that it is concentrated largely on the surface of the film, and it is not necessary to reduce the water content of the internal regions of the film.

Then, the film supported on the substrate is optionally subjected to a drain treatment to drain the excess of the polyfunctional compound solution for 10 seconds to 2 minutes, and then heat treated at a temperature of 70° to 150° C., preferably 90° to 130° C. This can complete the crosslinking reaction and achieve the insolubilization of the film of the base polymer.

Crosslinking agents which tend to exist as gases at room temperature, for example oxalyl dichloride or phosgene, can be contacted in the gaseous state with the aforesaid membrane to induce a crosslinking reaction.

The possible structure of the polymer of this invention crosslinked in the above manner along with the amino modification and crosslinking reaction is shown by the following three examples.

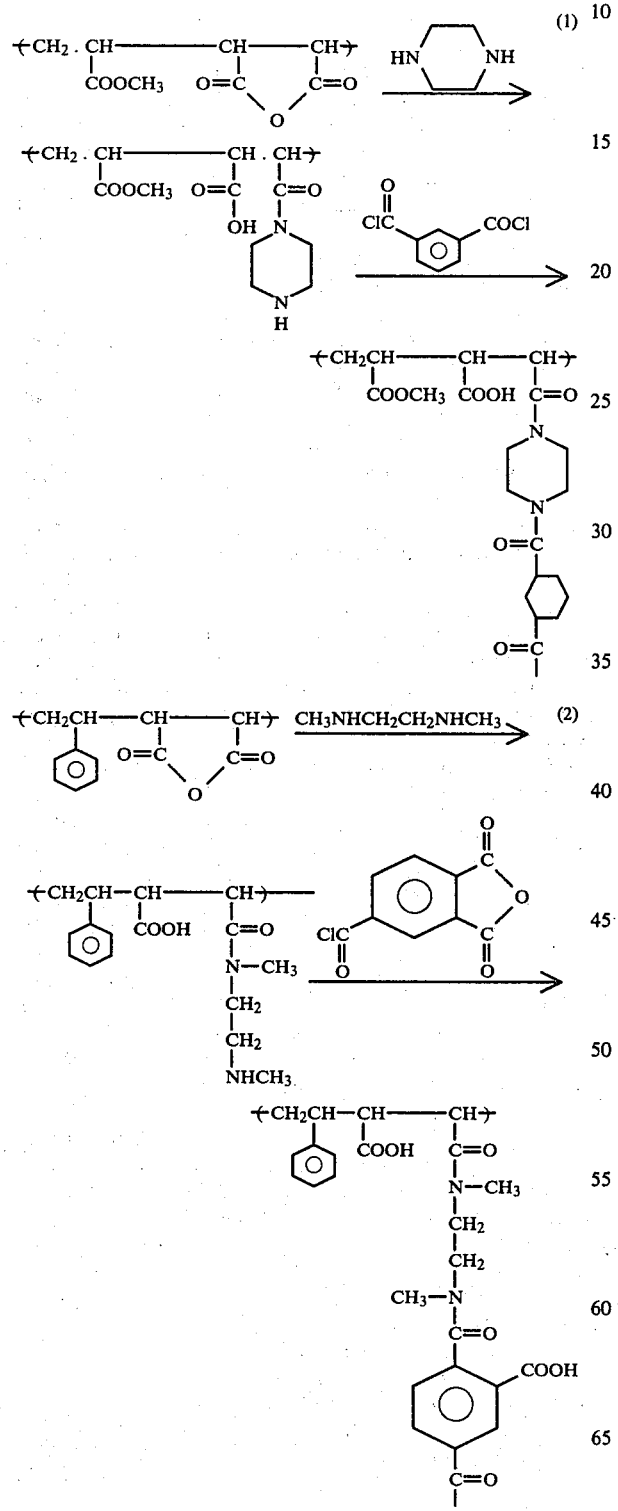

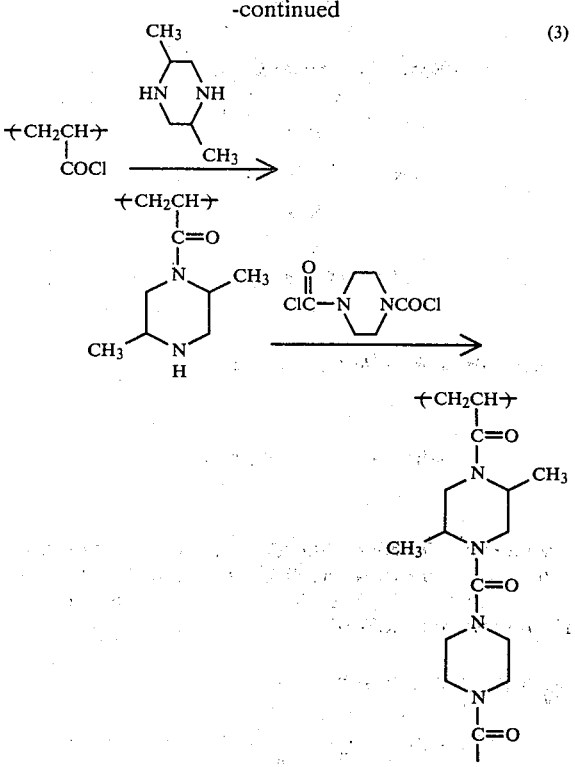

Thus, a composite membrane is obtained which has a thin film of the crosslinked polymer having permselectivity on the surface of the microporous substrate.

The resulting membrane can be used directly in applications to be described below. If required, it may be subjected to a post-treatment step to be described.

For example, the membrane can be treated with a solution of a compound containing a metal atom having the ability to form a chelate with a primary amino group, a secondary amino group, a hydroxyl group, a carboxyl group and/or a sulfo group to form a membrane in which such a functional group that may be present in the crosslinked thin film is chelated with the metal atom. This membrane has enhanced flux properties as compared with the untreated membrane. Examples of the metal compound which can be used for this treatment include $BaCl_2$, $MgCl_2$, $HgCl_2$, $CuCl_2$, $CaCl_2$, $FeCl_3$, $AlCl_3$ and $CoCl_3$. Of these, $FeCl_3$, $BaCl_2$, $CaCl_2$ and $MgCl_2$ are preferred.

This treatment can be easily performed by immersing the membrane in an aqueous solution of the metal compound (in a concentration of 1 to 30% by weight) for about 10 to 60 minutes.

The membrane thus obtained can be treated with a liquid polyepoxy compound, acrylonitrile, a lactone such as γ-butyrolactone or β-lactone, or propanesul one to improve its oxidation resistance and salt rejection further. This treatment can be performed by immersing the membrane in a solution (concentration about 0.5 to 3% by weight) of the treating agent at room temperature for 1 to 10 minutes.

Thus, according to this invention, there is provided a semipermeable composite membrane comprising a microporous substrate and a semipermeable thin film of the type described hereinabove formed on one surface of the microporous substrate. In the composite membrane, the thickness of the semipermeable thin film is not strictly set, and it may have a total thickness of at least 100 Å, usually 1,000 to 4,000 Å.

The composite membrane obtained by this invention can be used in various modules, but a spiral module is most preferred. When the composite membrane of this invention is fabricated into a spiral module, it is preferable to cover the surface of the composite membrane with a film of a water-soluble polymer in order to protect the surface.

Thus, it is also within the scope of this invention to provide a protective coating on the surface of the composite membrane of the invention. Deposition of the protective coating on the thin film is carried out by coating the barrier film with a water-soluble organic polymer such as polyvinyl alcohol, polyvinyl pyrrolidone, polyacrylamide, polyacrylic acid, polyvinyl methyl ether, and polyvinyl ethyl ether. Polyvinyl alcohol, polyvinyl pyrrolidone and polyvinyl methyl ether are preferred. The polymer is used as a 1-20 wt%, preferably 6-10 wt.%, aqueous solution. In a specific embodiment, the dried semipermeable composite membrane is passed through a solution of the water-soluble organic polymer or coating the polymer solution on the surface of this barrier film by known means such as dip coating, spraying, or brush coating to coat the film continuously with the solution of the water-soluble organic polymer; then the water is removed; and to form a final product, the coated semipermeable composite membrane is dried at a temperature of about 50° to 150° C., preferably about 90° to 130° C. for about 5 to 10 minutes.

The membrane having semipermeability provided by this invention is very suitable as a semipermeable membrane for the applications to be described because it has superior salt rejection and flux properties, especially flux properties, superior flexibility, high resistance to compaction and high resistance to chemical and biological degradation, especially oxidation resistance and hydrolysis resistance.

The membrane of this invention can be advantageously used as a semipermeable membrane to separate and remove tiny amounts of contaminated molecules dispersed or dissolved in a liquid or gas, and can find extensive application, for example in the desalting of sea water and brackish water, and the treatment of industrial effluents containing organic matter, liquids containing mixtures of organic substances, and waste waters from the food industry.

The membrane of this invention can be used especially advantageously as a reverse osmosis membrane in the method for desalination of saline or brackish water by reverse osmosis which comprises contacting the saline or brackish water under pressure with the reverse osmosis membrane. This method is known, and a specific procedure described, for example, in Ind. Eng. Chem. Found. 3, 206 (1964) can be used. Thus, the disclosure of this literature reference is incorporated herein by reference.

The following Examples illustrate the present invention more specifically. The reverse osmosis test carried out in these examples followed the procedure described below.

Reverse osmosis testing method

Reverse osmosis was carried out in an ordinary continuous pump-type reverse osmosis device using a 5000 ppm aqueous solution of sodium chloride at a pH of 7.0 and a temperature of 25° C. The operating pressure was 42.5 kg/cm$^2$.G.

Salt rejection

The salt rejection (%) is a value calculated from the following equation.

$$\text{Salt rejection (\%)} = \left(1 - \frac{\text{NaCl concentration in permeating water}}{\text{NaCl concentration in the test solution}}\right) \times 100$$

EXAMPLE 1

(A) Preparation of a fabric-reinforced microporous substrate:

A Dacron non-woven fabric (basis weight 180 g/m$^2$) was fixed on a glass plate. Then, a solution containing 12.5% by weight of polysulfone, 12.5% by weight of methyl Cellosolve and the remainder being dimethyl formamide was cast onto the fabric in a layer having a thickness of about 200 microns. Immediately, the polysulfone layer was gelled in a room temperature water bath to form a non-woven fabric-reinforced microporous polysulfone membrane.

The resulting microporous polysulfone layer had a thickness of about 40 to 70 microns and had an anisotropic structure. By observation with an electron micrograph, the surface of the microporous layer was found to contain numerous micropores with a size of 50 to 600 Å.

The resulting microporous substrate had a pure water flux (membrane constant) of about 3.0 to 7.0×10$^{-2}$ g/cm$^2$.sec.atm.

(B) Preparation of a composite semipermeable membrane:

A 500 ml. three-necked round-bottomed flask equipped with a stirrer, a thermometer and a reflux condenser was charged with 80 ml of dried and distilled benzene, 8.6 g of maleic anhydride recrystallized from chloroform, 8.6 g of distilled methyl acrylate and 0.7 g of azobisisobutyronitrile (AIBN). After purging the inside of the flask with nitrogen, the temperature of the inside of the flask was raised to 70° C., and the mixture was stirred for 8 hours, when a viscous polymer precipitated. The resulting polymer was thoroughly washed with anhydrous benzene, and dried at 50° C. under reduced pressure to afford 11.3 g of a white viscous solid polymer which was determined to be a 1:1 block copolymer of methyl acrylate and maleic anhydride as a result of IR and NMR analyses.

A 200 ml. flask was charged with 14.6 g of triethylene-tetramine [H$_2$N-(-CH$_2$CH$_2$NH-)$_3$H], 150 ml of distilled water and 8.6 g of the resulting copolymer. The inside of the flask was purged with nitrogen, and heated to 50° C. When the mixture was stirred for 3 hours, the above polymer became completely water-soluble. Addition of 100 ml of diethyl ether to an aqueous solution of the amine-modified polymer resulted in precipitation of the polymer. The polymer was dried under reduced pressure at 50° C. to afford 16.2 g of a viscous faintly yellow solid polymer. The amine equivalent of the polymer was determined by the peracetic acid-glacial acetic acid titration method, and found to be 10.3 milliequivalents/g.

The modified polymer obtained was dissolved in distilled water, and filtered on a microfilter to form a 2% by weight aqueous solution. The polysulfone porous membrane obtained in Example 1, (A) was dipped for 5 minutes in the aqueous solution, withdrawn from it after a lapse of the five-minute period, and allowed to stand perpendicularly to drain it for 10 minutes.

The drained membrane was dipped for 5 minutes at room temperature in a 1.5% n-hexane solution of a mixture of isophthaloyl chloride and trimesoyl chloride (in a 5:1 weight ratio) as a crosslinking agent, withdrawn, and drained for 1 minute in the air to volatilize the n-hexane adhering to the surface of the membrane. The membrane was then heat-treated for 10 minutes in a hot air dryer at 115° to 120° C.

The resulting composite membrane was subjected to a reverse osmosis test using a 0.5% aqueous NaCl solution at 25° C. under an operating pressure of 42.5 kg/cm$^2$.G. The composite membrane showed initial properties represented by a water flux of 103 liters/m$^2$.hr (61.8 G.F.D) and a salt rejection of 96.4%. When the membrane was so tested continuously for 200 hours, the water flux became 98 liters/m$^2$.hr (58.8 G.F.D) and the salt rejection became 96.8%, showing very stable properties (the coefficient of compaction: −0.009).

EXAMPLES 2 to 5

Instead of the triethylenetetramine used in Example 1, ethylenediamine, diethylenetriamine, tetraethylenepentamine or pentaethylenehexamine was reacted in the amounts shown in Table 1 with 8.6 g of the maleic anhydride/methyl acrylate copolymer obtained in Example 1 in the same way as in Example 1. Each of the amino-modified polymers obtained was made into a composite membrane in the same way as in Example 1, and tested for initial properties in reverse osmosis. The results are shown in Table 1.

TABLE 1

| Example | Polyamino compound | Amount (g) | Amine equivalent of the amine-modified polymer (meq./g) | Water flux l/m$^2$. hr | Salt rejection % |
|---|---|---|---|---|---|
| 2 | Ethylenediamine | 6.0 | 5.1 | 21.9 | 97.2 |
| 3 | Diethylenetriamine | 10.3 | 8.3 | 25.1 | 95.9 |
| 4 | Tetraethylene-pentamine | 18.9 | 11.9 | 100.0 | 95.1 |
| 5 | Pentaethylene-hexamine | 23.2 | 12.8 | 116.2 | 93.4 |

EXAMPLES 6 to 9

A composite membrane was obtained by modifying and crosslinking the methyl acrylate/maleic anhydride copolymer in the same way as in Example 1 except that as a crosslinking agent, isophthaloyl chloride or trimesoyl chloride alone was used instead of the mixture of isophthaloyl chloride and trimesoyl chloride, and diethylenetriamine, triethylenetetramine, tetraethylenepentamine or pentaethylenehexamine was used as the polyamine compound. The composite membrane was subjected to the same test as in Example 1. The initial properties in reverse osmosis obtained are shown in Table 2.

TABLE 2

| Example | Polyamino compound | Cross-linking agent* | Water flux (l/m$^2$. hr) | Salt rejection (%) |
|---|---|---|---|---|
| 6 | Diethylene-triamine | IPC | 14.8 | 91.9 |
|   |   | TMC | 74.8 | 96.3 |
| 7 | Tri-ethylene-tetramine | IPC | 78.0 | 94.5 |
|   |   | TMC | 165.5 | 95.9 |
| 8 | Tetra-ethylene-pentamine | IPC | 42.7 | 95.5 |
|   |   | TMC | 117.7 | 92.7 |
| 9 | Penta-ethylene hexamine | IPC | 100.5 | 96.8 |
|   |   | TMC | 117.0 | 93.8 |

*IPC: isophthaloyl chloride
TMC: trimesoyl chloride

EXAMPLE 10

A three-necked flask equipped with a stirrer and a thermometer was charged with 12.5 g of N,N-dimethacrylamide

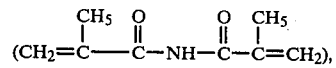

50 ml of benzene and 0.5 g of azobisisobutyronitrile. When the inside of the flask was purged with nitrogen and the mixture was stirred at room temperature for 15 hours, a rise in the viscosity of the reaction mixture was observed. The mixture was further stirred at 50° C. for 2 hours, and then was poured into a large amount of acetone to precipitate a white granular polymer. The polymer was well washed, and dried under reduced pressure to afford 8.7 g (yield 70%) of a white granular polymer.

IR and NMR analyses of the polymer gave the same spectrum as the absorption spectrum described in Die Makromolekulare Chemie 88, 133–148 (1965), and suggested its identification as a cyclic polymer of the following structure:

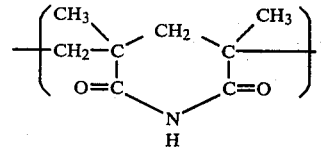

In a solution of 1.5 g of triethylenetetramine in 100 ml of distilled water was placed 1.2 g of the above polymer, and they were reacted at 50° C. for 2 hours to form a uniform aqueous solution.

Diethyl ether was added to the aqueous solution to precipitate the amine-modified polymer of the following structure:

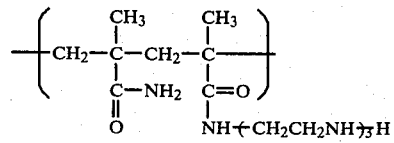

which was then dried under reduced pressure. The amine equivalent of the polymer was 6.6 meq./g.

The resulting amine-modified polymer was dissolved in distilled water, and filtered to afford a 2% aqueous solution, and then in the same way as in Example 1, a composite membrane was produced. The composite membrane was subjected to a reverse osmosis test, and was found to show a water flux of 73 liters/m².hr and a salt rejection 93.2%.

EXAMPLES 11 to 17

In the same way as in Example 1, methyl acrylate and ethyl fumarate were charged at a mole ratio of 5:1, and radical-polymerized to form a copolymer. The copolymer was reacted with each of the polyamino compounds shown in Table 3, and the resulting amine-modified polymer was crosslinked with each of the crosslinking agents shown in Table 3 to form a composite membrane. The composite membrane obtained were each subjected to the same reverse osmosis test, and the results obtained are shown in Table 3.

| Example | Polyamino compound | Amine equivalent of the amine-modified polymer (meq./g) | Crosslinking agent | Initial properties in reverse osmosis | |
|---|---|---|---|---|---|
| | | | | Water flux (l/m² . hr) | Salt rejection (%) |
| 11 | Triethylene tetramine | 9.7 | TMC (1*) | 127 | 95.3 |
| 12 | Triethylene tetramine | " | TDI (2*) | 43 | 97.5 |
| 13 | Triethylene tetramine | " | 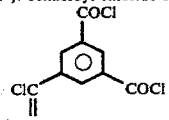 | 98 | 89.7 |
| 14 | Triethylene tetramine | " | (3*) 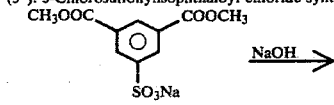 | 103 | 89.4 |
| 15 | Aminoethylpiperazine (4*) | 7.8 | TMC | 54 | 90.5 |
| 16 | 1,4-Diaminocyclohexane | 5.1 | TMC | 37 | 91.2 |
| 17 | m-Phenylenediamine | 3.2 | TMC | 23 | 87.7 |

(1*): Trimesoyl chloride of the formula

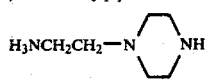

(2*): TDI: tolylene diisocyanate
(3*): 3-Chlorosulfonylisophthaloyl chloride synthesized by the following method.

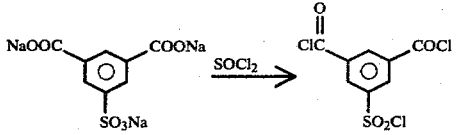

(4*): Aminoethylpiperazine of the formula $H_3NCH_2CH_2-N\underset{\phantom{xx}}{\diagup\!\!\!\diagdown}NH$

EXAMPLE 18

Distilled sulfonyl chloride (150 ml) was put into a 500 ml three-necked flask equipped with a stirrer, a dropping funnel and a reflux condenser, and while stirring the material, 20 g of polyacrylic acid having a number average molecular weight of 100,000 was added dropwise from the dropping funnel over the course of 2 hours. After the addition, the temperature of the inside of the flask was raised to 50°-60° C., and the mixture was further stirred for 3 hours to form a uniform solution. Removal of the sulfonyl chloride from the solution by evaporation afforded poly(acryloyl chloride) as a reddish brown solid.

A 200 ml. flask was charged with 100 ml of distilled water and 8.6 g of piperazine, and the mixture was stirred to dissolve the piperazine completely. Then, 4.4 g of the poly(acryloyl chloride) was added, and the mixture was stirred at room temperature for 1 hour. The resulting aqueous solution of the piperazine-modified poly(acryloyl chloride) was filtered, and 50 ml of diethyl ether was added to precipitate the piperazine-modified polymer. The amine equivalent of the polymer was 4.9 meq./g.

The polymer was dissolved in distilled water to form a 2% aqueous solution, and using this aqueous solution, a composite film was prepared in the same way as in Example 1. When the composite membrane was subjected to a reverse osmosis test, it showed initial properties represented by a water flux of 85 liters/$m^2$.hr and a salt rejection of 87.5%.

EXAMPLE 19

A 300 ml. flask was charged with 8.6 g of piperazine, 150 ml of distilled water and 9.2 g of the methylacrylate-maleic anhydride polymer obtained in Example 1. After replacing the inside atmosphere of the flask by nitrogen, the mixture was heated to 50° C., and stirred for 3 hours. The polymer became completely water-soluble. The resulting aqueous solution was purified by dialysis with a cellophane membrane, and under reduced pressure, water was evaporated to afford 12.3 g of a pale yellow solid. The amine equivalent of the yellow solid was determined by the peracetic acid-glacial acetic acid titrating method to be 3.2 milliequivalents/g.

The resulting piperazine-modified polymer was dissolved in distilled water, and filtered on a microfilter to form a 2% by weight aqueous solution. The polysulfone porous membrane obtained in Example 1, (A) was dipped for 5 minutes in the aqueous solution, withdrawn from it after a lapse of the 5-minute period, and drained for 10 minutes while it was caused to stand perpendicularly.

The drained membrane was dipped for 5 minutes at room temperature in a 1.5% n-hexane solution of a 5:1 (by weight) mixture of isophthaloyl chloride and trimesoyl chloride as a crosslinking agent, then withdrawn, and drained for 1 minute in the air to volatilize the n-hexane adhering to the surface of the membrane.

The resulting composite membrane was subjected to the reverse osmosis test using a 0.5% aqueous NaCl solution at a pH of 6 to 6.5 and a chlorine concentration of 5 ppm at an operating pressure of 42.5 kg/$cm^2$.G at 25° C. The composite membrane showed initial properties represented by a water flux of 58 liters/$m^2$.hr and a salt rejection of 92.4%. When the reverse osmosis was continued for 900 hours at a chlorine concentration of 4 to 5 ppm and a pH of 6 to 6.5, the water reflux was 51 liters/$m^2$.hr and the salt rejection was 93.1%, showing very stable properties (the coefficient of compaction: −0.019).

EXAMPLES 20 to 22

The procedure of Example 19 was repeated except that 2,5-dimethylpiperazine, 2-methylpiperazine or 1,3-dipiperidylpropane was used instead of the piperazine used in Example 19 and reacted in the amounts shown in Table 4 with 9.2 g of the maleic anhydride/methyl acrylate copolymer obtained in Example 19. Each of the resulting amine-modified polymers was made into a composite membrane and subjected to the reverse osmosis test in the same way as in Example 19. The initial properties shown in Table 4 were obtained.

TABLE 4

| Example | Polyamino compound | Amount charged (g) | Amine equivalent of amine-modified polymer (meq./g) | Initial properties in reverse osmosis Water flux (l/$m^2$ . hr) | Salt rejection |
|---|---|---|---|---|---|
| 20 | 2,5-dimethylpiperazine | 11.4 | 2.9 | 49.5 | 90.8 |
| 21 | 2-methylpiperazine | 10.0 | 3.0 | 51.7 | 92.8 |
| 22 | 1,3-dipiperidylpropane | 21.0 | 2.2 | 35.9 | 91.7 |

EXAMPLES 23 to 27

A composite membrane was obtained by modifying and crosslinking a methyl acrylate/maleic anhydride copolymer in the same way as in Example 1 except that isophthaloyl chloride or trimesoyl chloride alone was used instead of the mixture of isophthaloyl chloride and trimesoyl chloride as a crosslinking agent, and piperazine, N,N'-dimethylethylenediamine, N,N'-dimethylmetaphenylenediamine, or N,N'-dimethyldiethylenetriamine was used as the polyamino compound. The initial properties of the resulting composite membranes in reverse osmosis were as shown in Table 5.

TABLE 5

| Example | Polyamino compound | Crosslinking agent | water flux (L/m².hr) | Salt rejection (%) |
|---|---|---|---|---|
| 23 | HN⌒NH (piperazine) | IPC* | 37.4 | 94.5 |
| 24 | HN⌒NH (piperazine) | TMC* | 78.3 | 89.7 |
| 25 | $CH_3NHCH_2CH_2NHCH_3$ | IPC | 29.3 | 91.6 |
|    |                        | TMC | 53.2 | 87.4 |
| 26 | $CH_3NH$–C$_6$H$_4$–$NHCH_3$ | IPC | 21.7 | 93.3 |
|    |                              | TMC | 35.9 | 90.3 |
| 27 | $CH_3NH(CH_2CH_2NH)_2CH_2CH_2$–NH–$CH_3$ | IPC | 43.8 | 91.8 |
|    |                                              | TMC | 63.9 | 90.2 |

EXAMPLE 28

7.7 g Of the poly(N,N-dimethacrylamide) obtained in example 10 was put into a solution of 8.6 g of piperazine in 100 ml of distilled water, and they were reacted at 50° C. for 2 hours to form a uniform aqueous solution.

The aqueous solution was purified by dialysis in the same way as in Example 19, and then water was evaporated to afford 10.5 g of an amine-modified polymer of the following structure.

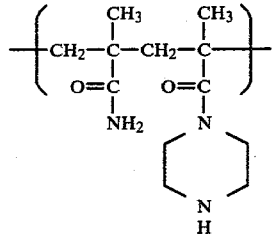

The amine equivalent of the modified polymer was 3.9 milliequivalents/g. The amine-modified polymer so obtained was dissolved in distilled water, and filtered to afford a 2% aqueous solution. Using the aqueous solution, a composite membrane was prepared in the same way as in Example 19. The composite membrane was subjected to the reverse osmosis test, and was found to have a water flux of 137 liters/m².hr and a salt rejection of 82.3%.

EXAMPLE 29

Distilled sulfonyl chloride (150 ml) was put into a 500 ml. three-necked flask equipped with a dropping funnel and a reflux condenser, and while stirring the material, 20 g of polymethacrylic acid (a number average molecular weight 100,000) was added dropwise from the dropping funnel over the course of 2 hours. After the addition, the temperature of the inside of the flask was raised to 50°–60° C., and the mixture was stirred further for 3 hours. Thus, the reaction mixture became a uniform solution. Removal of the sulfonyl chloride by distillation afforded poly(methacryloyl chloride) as a reddish brown solid. A 200 ml flask was charged with 100 ml of distilled water and 8.6 g of piperazine, and after completely dissolving the piperazine by stirring, 4.4 g of the resulting poly(methacryloyl chloride) was added, and the mixture was stirred at room temperature for 1 hour. The resulting aqueous solution of piperazine-modified poly(methacryloyl chloride) was filtered, and 50 ml of diethyl ether was added to precipitate the piperazine-modified polymer. The amine equivalent of the polymer was 4.9 milliequivalents/g.

The polymer was dissolved in distilled water to form a 2% aqueous solution. A composite membrane was prepared in the same way as in Example 1 using the aqueous solution. The composite membrane was subjected to the reverse osmosis test, and found to have initial properties represented by a water flux of 47.3 liters/m².hr and a salt rejection of 92.5%.

EXAMPLE 30

An excess of chlorosulfonic acid was added at 0° C. to a solution of polysulfone (Udel-3500: a product of Union Carbide Corporation) in chloroform to form chlorosulfonated polysulfone (the degree of chlorosulfonation 75%).

Two grams of the chlorosulfonated polysulfone was added to a 10% by weight aqueous solution of piperazine in 100 ml of distilled water. The mixture was stirred at 50° C. for 15 hours to afford a milk-white emulsion. The emulsion was filtered, and dialyzed to form an emulsion of modified polysulfone containing 1.5 milliequivalents/g of a recurring structural unit of the following formula:

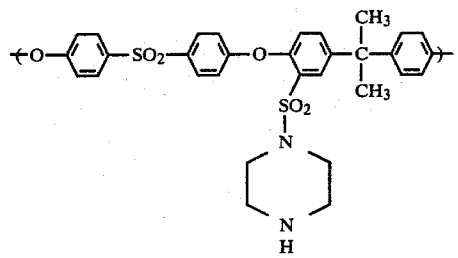

The concentration of this emulsion was adjusted to 1% by weight, and using the emulsion, a composite membrane was prepared in the same way as in Example 1. The composite membrane had a water flux of 21.7 liters/m².hr and a salt rejection of 90.0%. No change in these properties was seen even after it was subjected continuously to the reverse osmosis test in a sodium chloride solution for 500 hours.

EXAMPLE 31

Two grams of para-chlorocarbonyl polystyrene of the formula

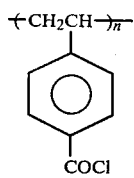

was added to an aqueous solution obtained by dissolving 10 g of 2,5-dimethylpiperazine in 100 ml of distilled water, and they were reacted at 15° to 10° C. for 5 hours to afford an emulsion containing 1.8 milliequivalents/g of a polymer having the following structural unit:

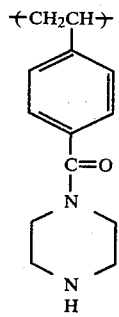

Using a 1% by weight emulsion of the polymer, a composite membrane was prepared in the same way as in Example 1, and subjected to the reverse osmosis test. It was found to have a water flux of 35.2 liters/m².hr and a salt rejection of 94.7%.

EXAMPLE 32

Methyl acrylate (7 g) and 3 g of sodium methallylsulfonate were dissolved in 50 ml of a mixture of water and methanol (1:1 by weight), and in the presence of 0.3 g of potassium persulfate, were polymerized at 60° C. for 7 hours to form a polymer containing a structural unit of the following formula:

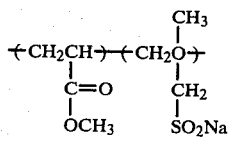

The ion-exchange capacity of this polymer was 0.95 milliequivalent/g.

Five grams of the polymer was suspended in methylene chloride, and 100 ml of sulfonyl chloride was added. The mixture was heated at 60° to 70° C. for 8 hours to afford a polymer having a structural unit of the following formula:

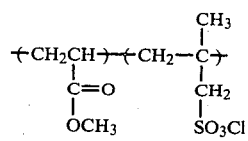

Subsequently, 2 g of this polymer was added to 100 g of a 10% aqueous solution of N,N'-dimethylethylenediamine, and reacted at 50° C. for 10 hours to afford a polymer containing 0.71 milliequivalent/g of a structural unit of the following formula:

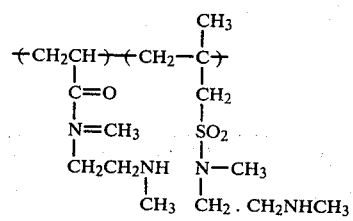

One gram of this polymer was dissolved in 100 ml of a mixture of water and ethanol (1:1 by weight), and using the solution, a composite membrane was prepared in the same way as in Example 1. The composite membrane had a water flux of 59.7 liters/m².hr and a salt rejection of 97.8%.

EXAMPLES 33 TO 38

A 500 ml three-necked round-bottomed flask equipped with a stirrer, a thermometer and a reflux condenser was charged with 80 ml of dried and distilled benzene, 8.6 g of maleic anhydride recrystallized from chloroform, and each of the comonomers shown in Table 6. The inside of the flask was purged with nitrogen, and in a sealed condition, the temperature of the inside of the flask was raised to 70° C. The mixture was stirred for 8 hours to precipitate a viscous polymer. The polymer was well washed with anhydrous benzene, and dried at 50° C. under reduced pressure to afford a white viscous solid polymer in a yield of 80 to 85%. IR and NMR analyses of the polymer showed that it was a 1:1 copolymer of maleic anhydride and the comonomer.

A 300 ml flask was charged with each of the polyamines indicated in Table 6, 100 ml of N-methylpyrrolidone, and 10 g of the above copolymer. The inside of the flask was purged with nitrogen; and its temperature was raised to 50° C. The mixture was stirred for 3 hours to form an amine-modified polymer. The modified polymer solution was dialyzed with a cellophane membrane to remove the excess of unreacted polyamine and N-methylpyrrolidone, and then water was evaporated under reduced pressure to afford a pale yellow solid.

The resulting amine-modified polymer was dissolved in distilled water, and filtered on a microfilter to form an aqueous solution having each of the concentrations shown in Table 6, and then the acid acceptor shown in Table 6 was added.

The polysulfone porous membrane obtained in Example 1, (A) was dipped for 5 minutes in this aqueous solution, then withdrawn from it, and drained for 10 minutes while it was allowed to stand perpendicularly.

The drained membrane was dipped for 5 minutes at room temperature in an n-hexane solution of each of the crosslinking agents indicated in Table 6, withdrawn, and then drained in the air for 1 minute to volatilize the n-hexane adhering to the surface of the membrane. The membrane was then heat-treated for 10 minutes in a hot air dryer at 115° to 120° C.

The resulting composite membrane was subjected to the reverse osmosis test at 25° C. and 42.5 kg/cm$^2$.G using a 0.5% aqueous NaCl solution. The initial properties obtained of the composite membrane are shown in Table 1.

The membrane was subsequently tested continuously for 20 hours, and the coefficient of compaction obtained is also shown in Table 6.

TABLE 6

| Example | Comonomer (g) | Polyamino compound (g) | Concentration of the amine-modified polymer (wt. %) | Acid acceptor | Cross-linking agent (%) | Water flux (l/m$^2$ hr) | Salt rejection (%) | Coefficient of compaction |
|---|---|---|---|---|---|---|---|---|
| 33 | CH$_2$=CH–OCH$_3$ (5.8) | H$_2$N$\leftarrow$CH$_2$CH$_2$NH$\rightarrow_{\overline{3}}$H (30.0) | 2.0 | — | IPC (0.5) | 35.6 | 92.6 | −0.032 |
| 34 | CH$_2$=CH–OCH$_2$CH$_2$Cl (10.7) | H$_2$N$\leftarrow$CH$_2$CH$_2$NH$\rightarrow_{\overline{3}}$H (22.4) | 0.5 | — | IPC/TMC(5/1) (0.5) | 134.2 | 90.7 | −0.024 |
| 35 | CH$_2$=CH–OCH$_2$CH$_2$Cl (10.7) | H$_2$N$\leftarrow$CH$_2$CH$_2$NH$\rightarrow_{\overline{3}}$H (22.4) | 2.0 | — | IPC/TMC(5/1) (1.5) | 64.7 | 94.8 | −0.038 |
| 36 | CH$_2$=CH–OCH$_2$CH$_2$Cl (10.7) | H$_2$N$\leftarrow$CH$_2$CH$_2$NH$\rightarrow_{\overline{3}}$H (22.4) | 1.0 | H$_2$N$\leftarrow$CH$_2$CH$_2$NH$\rightarrow_{\overline{3}}$H | IPC (1.0) | 63.8 | 95.4 | −0.022 |
| 37 | CH$_2$=CH–OCH$_2$CH$_3$ (7.2) | H$_2$N$\leftarrow$CH$_2$CH$_2$NH$\rightarrow_{\overline{3}}$H (24.6) | " | — | IPC (1.0) | 47.8 | 95.3 | |
| 38 | CH$_2$=CH–OCH$_3$ (5.8) | HN⟨⟩NH (17.7) | 2.0 | — | IPC/TMC(5/1) (1.5) | 42.1* | 91.6* | |

*NaOCl (3 ppm) was added; pH = 6.0

What we claim is:

1. A semipermeable composite membrane comprising a thin semipermeable film of a polymeric material deposited on one side of a microporous substrate, said polymeric material being prepared by crosslinking a soluble polymer containing at least 30 mole% of a recurring unit of the formula $$\begin{array}{c} (L)_p \\ | \\ -Q- \\ | \\ Y-Z-N \diagdown_{R_2}^{R_1} \end{array} \quad (I)$$

wherein

Q represents an organic radical containing 2 to 30 carbon atoms and having a valence of (3+p) which optionally contains a heteroatom selected from the group consisting of oxygen, sulfur, nitrogen and halogen atoms;

Y is bonded to the carbon atom in group Q and represents a direct bond, an alkylene group containing 1 to 3 carbon atoms or an unsubstituted or substituted phenylene group;

Z represents $$-\overset{\overset{\displaystyle O}{\|}}{C}- \quad \text{or} \quad -SO_2-;$$

R$_1$ represents a hydrogen atom, or a monovalent organic radical containing 1 to 20 carbon atoms which may contain an amino group containing 1 to 2 active hydrogen atoms and a heteroatom selected from the group consisting of oxygen, nitrogen and halogen atoms;

R$_2$ represents an amino group containing 1 to 2 active hydrogen atoms or a monovalent organic radical containing 1 to 20 carbon atoms contains at least one amino group containing 1 to 2 active hydrogen atoms and may contain a heteroatom selected from the group consisting of oxygen, nitrogen and halogen atoms;

R$_1$ and R$_2$, together with the nitrogen atom to which they are bonded may represent a 5- to 18-membered nitrogen-containing heterocyclic ring which contains at least one amino group having one active hydrogen atom;

when group Y represents a direct bond and group Z represents $$-\overset{\overset{\displaystyle O}{\|}}{C}-,$$

R$_1$ may represent $$-\overset{\overset{\displaystyle O}{\|}}{C}-$$

bonded to that carbon atom of the group Q which is bonded, either directly or through 1 or 2 carbon atoms, to the carbon atom to which the group Y is bonded;

p is 0, 1 or 2; and when p is 1 or 2, L represents the group

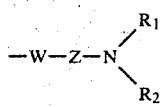

in which W represents a direct bond or an alkylene group containing 1 to 3 carbon atoms and Z, $R_1$ and $R_2$ are as defined above, and having at least 0.2 milliequivalent, per gram of said polymer, of an amino group containing 1 or 2 active hydrogen atoms, with a polyfunctional compound containing at least two functional groups capable of reacting with the amino group having 1 or 2 active hydrogen atoms.

2. The membrane of claim 1 wherein said polymer contains at least 50 mole% of the recurring unit of formula (I).

3. The membrane of claim 1 wherein said recurring unit is represented by the formula (I-a)

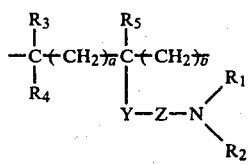 (I-a)

wherein $R_3$ represents a hydrogen atom or an alkyl group containing 1 to 5 carbon atoms;

$R_4$ and $R_5$, independently from each other, represent a hydrogen atom, an alkyl group containing 1 to 5 carbon atoms, or the group

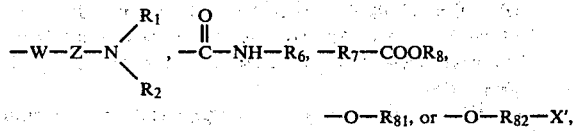

in which $R_6$ represents a hydrogen atom or an alkyl group containing 1 to 5 carbon atoms, $R_7$ represents a direct bond or an alkylene group containing 1 to 3 carbon atoms, $R_8$ represents a hydrogen atom, an alkali metal, a quaternary ammonium salt radical or an alkyl group containing 1 to 5 carbon atoms, $R_{81}$ represents an alkyl group containing 1 to 5 carbon atoms, $R_{82}$ represents an alkylene group containing 1 to 4 carbon atoms, and X' represents chlorine or bromine; W, Y, Z, $R_1$ and $R_2$ are as defined hereinabove; and a and b, independently from each other, are 0 or 1; or the following formula (I-b)

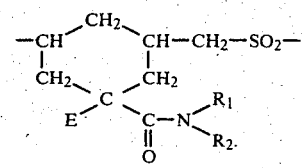 (I-b)

wherein

E represents a hydrogen atom or the group

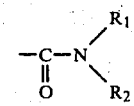

and $R_1$ and $R_2$ are as defined hereinabove.

4. The membrane of claim 1 wherein said recurring unit is represented by the following formula (I-c)

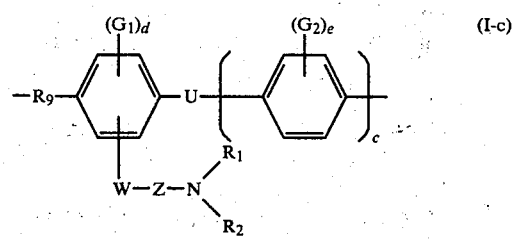 (I-c)

wherein $R_9$ represents a direct bond or the group

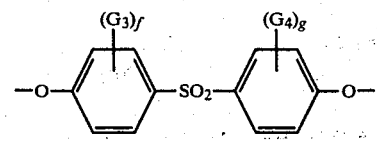

U represents

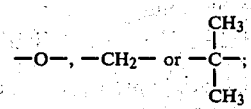

$G_1$ and $G_2$, independently from each other, represent a halogen atom, an alkyl group containing 1 to 3 carbon atoms, a haloalkyl group containing 1 to 3 carbon atoms or the group

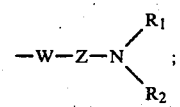

c, d and e, independently from each other, are 0 or 1;

$G_3$ and $G_4$, independently from each other, represent a halogen atom, an alkyl group containing 1 to 3 carbon atoms, or a haloalkyl group containing 1 to 3 carbon atoms;

f and g, independently from each other, are integers of 0 to 2; and

W, Z, $R_1$ and $R_2$ are as defined hereinabove.

5. The membrane of claim 1 wherein Y represents a direct bond, a methylene group or a phenylene group of the formula

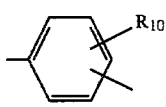

in which $R_{10}$ represents a hydrogen atom,

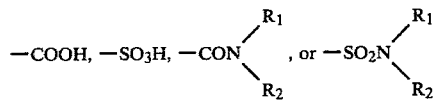

6. The membrane of claim 4 wherein W represents a direct bond or a methylene group.

7. The membrane of claim 1 wherein Z is

8. The membrane of claim 1 wherein group

represents a monovalent substituted amino group resulting from the removal of one active hydrogen atom from one of the amino groups of a polyamino compound containing at least two amino groups with 1 or 2 active hydrogen atoms.

9. The membrane of claim 1 wherein $R_1$ represents a hydrogen atom, or an alkyl, cycloalkyl, aryl, aralkyl or heterocyclic group containing 1 to 20 carbon atoms which may contain 1 to 8 heteroatoms or heteroatom-containing atomic groupings selected from the group consisting of halogen atoms, hydroxyl groups, cyano groups, carboxyl groups, alkoxycarbonyl groups with the alkyl moiety containing 1 to 5 carbon atoms, primary amino groups (—NH$_2$), ether linkages (—O—), imino linkages (—NH—) and tertiary amino linkages

$R_2$ represents a primary amino group, a secondary amino group monosubstituted by an alkyl group containing 1 to 5 carbon atoms, or an alkyl, cycloalkyl, aryl, aralkyl or heterocyclic group containing 1 to 20 carbon atoms which contains 1 to 10 primary amino groups or imino linkages and may contain 1 to 9 heteroatoms or heteroatom-containing atomic groupings selected from the group consisting of halogen atoms, hydroxyl groups, cyano groups, carboxyl groups alkoxycarbonyl groups with the alkyl moiety containing 1 to 5 carbon atoms, ether linkages are tertiary amino linkages

or $R_1$ and $R_2$, together with the nitrogen atom to which they are bonded, may represent a 5- to 18-membered heterocyclic ring which contains at least one amino group having one active hydrogen atom and may contain 1 to 4 nitrogen or oxygen atoms as heteroatoms.

10. The membrane of claim 1 wherein said recurring unit is represented by the following formula (I-d)

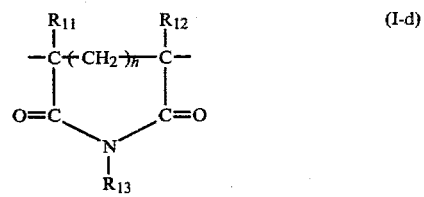

wherein $R_{11}$ and $R_{12}$, independently from each other, represent a hydrogen atom or a methyl group;

$R_{13}$ represents a primary amino group, a secondary amino group, a secondary amino group mono-substituted by an alkyl group containing 1 to 5 carbon atoms, or an alkyl, cycloalkyl, aryl, aralkyl or heterocyclic group containing 1 to 20 carbon atoms which contains 1 to 10 primary amino groups or imino linkages and may contain 1 to 9 heteroatoms or heteroatom-containing atomic groupings selected from the group consisting of halogen atoms, hydroxyl groups, cyano groups, carboxyl groups, alkoxycarbonyl groups with the alkyl moiety containing 1 to 5 carbon atoms, ether linkages and tertiary amino linkages

and h is 0 or 1.

11. The membrane of claim 3 wherein said recurring unit is represented by the following formula (I-a-1)

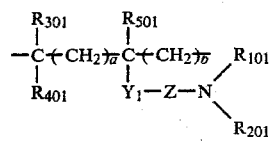

wherein $R_{301}$ represents a hydrogen atom or a methyl group;

$R_{401}$ and $R_{501}$, independently from each other, represent a hydrogen atom, a methyl group,

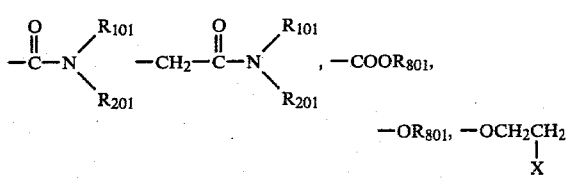

in which X is chlorine or bromine, or —CH$_2$—COOR$_{801}$;

$Y_1$ represents a direct bond, a methylene group or a phenylene group of the formula

in which R₁₀ represents a hydrogen atom,

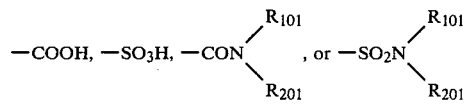

Z represents

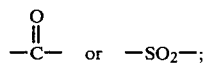

$R_{101}$ represents a hydrogen atom, an alkyl, cycloalkyl, aryl, aralkyl or heterocyclic group containing 1 to 12 carbon atoms which may contain 1 to 8 heteroatoms or heteroatom-containing atomic groupings selected from the group consisting of halogen atoms, hydroxyl groups cyano groups, carboxyl groups, alkoxycarbonyl groups with the alkyl moiety containing 1 to 5 carbon atoms, primary amino groups (—NH₂), ether linkages (—O—), imino linkages (—NH—), and tertiary amino linkages

$R_{201}$ represents a primary amino group, a secondary amino group monosubstituted by an alkyl group containing 1 to 5 carbon atoms, or an alkyl, cycloalkyl, aryl, aralkyl or heterocyclic group containing 1 to 12 carbon atoms which contains 1 to 6 primary amino groups or imino linkages and may contain 1 to 6 heteroatoms or heteroatom-containing atomic groupings selected from the group consisting of halogen atoms, hydroxyl group, cyano groups, carboxyl groups, alkoxycarbonyl groups with the alkyl moiety containing 1 to 5 carbon atoms, ether linkages and tertiary amino linkages

$R_{101}$ and $R_{201}$, together with the nitrogen atom to which they are bonded, may represent a 5- to 6-membered nitrogen-containing heterocyclic ring which contains at least one amino group having one active hydrogen atom and may contain 1 to 2 nitrogen or oxygen atoms as heteroatoms;

$R_{801}$ represents a hydrogen atom or an alkyl group containing 1 to 3 carbon atoms; and a and b, independently from each other, are 0 or 1.

12. The membrane of claim 8 wherein said polyamino compound is a compound expressed by the following formula

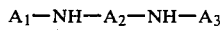

-continued

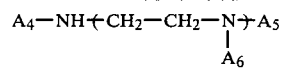

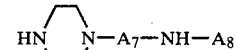

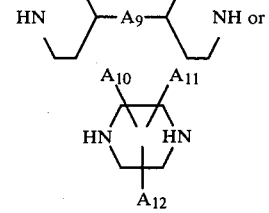

wherein $A_1$ and $A_3$, independently from each other, represent a hydrogen atom or a lower alkyl group; $A_2$ represents an alkylene group having 1 to 10 carbon atoms which may contain an ether linkage; $A_4$ and $A_5$, independently from each other, represent a hydrogen atom or a lower alkyl group optionally substituted with a cyano, hydroxyl or lower alkoxycarbonyl group; $A_6$ represents a hydrogen atom or a group of the formula —CH₂—CH₂—NH—A₄; $A_7$ represents a lower alkylene group; $A_8$ represents a hydrogen atom or a lower alkyl group optionally substituted with a cyano, hydroxyl or lower alkoxycarbonyl group; $A_9$ represents a lower alkylene group; at least one of $A_{10}$, $A_{11}$ and $A_{12}$ represents a lower alkyl group, and the remainder represent a hydrogen atom; and i is an integer of 2 to 6.

13. The membrane of claim 1 wherein the polymer is a polymer consisting essentially of the recurring unit (I) alone.

14. The membrane of claim 3 or 10 wherein said polymer is a copolymer composed of the recurring unit of formula (I-a), (I-b) or (I-d) and at least one other recurring unit derived from a radical polymerizable monomer.

15. The membrane of claim 14 wherein said radical polymerizable monomer is a compound containing one or two ethylenically unsaturated bonds.

16. The membrane of claim 15 wherein said compound containing one or two ethylenically unsaturated bonds contains 2 to 15 carbon atoms.

17. The membrane of claim 15 wherein said compound containing one or two ethylenically unsaturated bonds has a molecular weight of 28 to 300.

18. The membrane of claim 15 wherein said compound containing one or two ethylenically unsaturated bonds has a solubility of at least 0.5 g at 25° C. in 100 g of water or a lower alcohol.

19. The membrane of claim 14 wherein said monomer is a compound represented by the following formula (III-1)

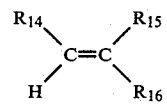

wherein $R_{14}$ represents a hydrogen atom or an alkoxycarbonyl group with the alkyl moiety containing 1 to 10 carbon atoms;

$R_{15}$ represents a hydrogen or halogen atom or a methyl group, $R_{16}$ represents a hydrogen or halogen atom, an alkoxy group containing 1 to 10 carbon atoms optionally substituted by a hydroxyl group and/or a halogen atom, an alkoxycarbonyl group with the alkyl moiety containing 1 to 10 carbon atoms, an alkanoyl group containing 1 to 10 carbon atoms, an alkanoyloxy group containing 1 to 10 carbon atoms, an alkyl group containing 1 to 10 carbon atoms substituted by the group —SO$_3$M or hydroxyl group, a phenyl group optionally substituted by the group —SO$_3$M or a methyl group, a glycidyloxy group, or a group of the formula —B-O$)_j$H in which B represents an ethylene or propylene group, and j is an integer of 1 to 8;

$R_{14}$ and $R_{15}$, together, may represent an ethylenedioxy group; and M represents an alkali metal; or the following formula (III-2)

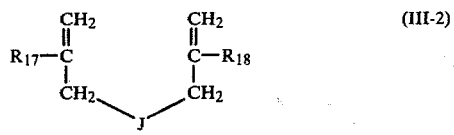

wherein $R_{17}$ and $R_{18}$, independently from each other, represent a hydrogen atom or a methyl group;

J represents an oxygen atom or a group of the formula

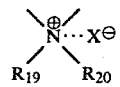

$R_{19}$ and $R_{20}$, independently from each other, represent a hydrogen atom or an alkyl group containing 1 to 10 carbon atoms; and X$^\ominus$ represents an anion.

20. The membrane of claim 3 or 10 wherein said polymer is a copolymer composed of
(A) at least 50 mole% of the recurring unit of formula (I-a), (I-b) or (I-d), and
(B) up to 50 mole% of at least one recurring units selected from those of the formulae

wherein $R_{21}$ represents a hydrogen atom or an alkoxycarbonyl group with the alkyl moiety containing 1 to 10 carbon atoms;

$R_{22}$ represents a hydrogen or halogen atom or a methyl group;

$R_{23}$ represents a hydrogen or halogen atom, an alkoxy group containing 1 to 10 carbon atoms optionally mono- or di-substituted by a hydroxyl group and/or a halogen atom, an alkoxycarbonyl group with the alkyl moiety containing 1 to 10 carbon atoms, an alkanoyl group containing 1 to 10 carbon atoms, an alkanoyloxy group containing 1 to 10 carbon atoms, an alkyl group containing 1 to 10 carbon atoms which may be mono-substituted by the group —SO$_3$M or a hydrooxy group, a phenyl group optionally mono-substituted by the group —SO$_3$M or a methyl group, a glycidyloxy group, a group of the formula —B-O$)_j$H in which B represents an ethylene or propylene group and j is an integer of 1 to 8, the group

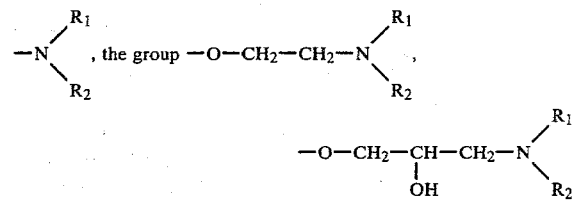

in which $R_1$ and $R_2$ are defined hereinabove;

$R_{21}$ and $R_{22}$ together may represent an ethylenedioxy group;

$R_{22}$ and $R_{23}$ together may represent

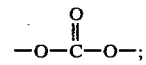

and M represents an alkali metal; and

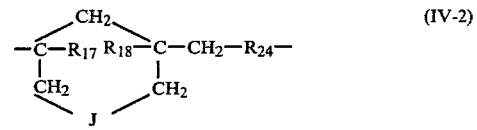

wherein $R_{17}$, $R_{18}$ and J are as defined with regard to formula (III-a), and $R_{24}$ represents a direct bond or —SO$_2$—.

21. The membrane of claim 1 wherein said polymer has a solubility of at least 0.1 g at 25° C. in 100 g of water or a water-miscible polar organic solvent.

22. The membrane of claim 1 wherein said polymer has a solubility of at least 0.5 g at 25° C. in 100 g of water or a water-miscible polar organic solvent.

23. The membrane of claim 21 or 22 wherein said organic solvent is selected from the group consisting of lower alcohols, formic acid, dimethylformamide, dimethylsulfoxide, tetramethylenesulfone and N-methylpyrrolidone.

24. The membrane of claim 1 wherein said polymer has an inherent viscosity, determined at 30° C. in the solvent of claims 22 or 23 with 0.5% by weight of the polymer solution, of at least 0.1 dl/g.

25. The membrane, of claim 1 wherein said polymer has an inherent viscosity, determined at 30° C. in the solvent of claims 22 or 23 with 0.5% by weight of the polymer solution, of 0.15 to 5.0 dl/g.

26. The membrane of claim 1 wherein said polyfunctional compound is a polyfunctional compound containing at least two functional groups selected from acid halide, sulfonyl halide, isocyanate, N-haloformyl, haloformate and acid anhydride groups, or cycnuric chloride.

27. The membrane of claim 1 wherein the polyfunctional compound is an aromatic, heterocyclic or alicyclic compound.

28. The membrane of claim 1 wherein the polyfunctional compound is an aromatic compound.

29. The membrane of claim 1 wherein the polyfunctional compound is a di- or tri-functional aromatic compound containing two or three functional groups selected from acid halide, sulfonyl halide and acid anhydride groups.

30. The membrane of claim 1 wherein the polyfunctional compound is a difunctional aromatic compound containing two isocyanate groups.

31. The membrane of claim 1 wherein the polyfunctional compound is a trifunctional aromatic compound, or a mixture of a difunctional aromatic compound and a trifunctional aromatic compound.

32. The membrane of claim 31 wherein the di- or tri-functional aromatic compound is isophthaloyl chloride, terephthaloyl chloride, trimesoyl chloride, 3-chlorosulfonylisophthaloyl chloride, or cyanuric acid chloride.

33. The membrane of claim 1 wherein said thin semipermeable film has a thickness of at least about 100 A.

34. The membrane of claim 1 wherein said microporous substrate is composed of an asymmetrical membrane of an aromatic polysulfone.

35. A process for producing a semipermeable composite membrane which comprises
(a) treating a microporous substrate with a solution containing a soluble polymer containing at least 30 mole% of a recurring unit of formula (I)

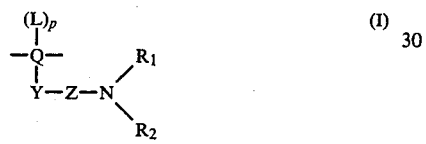
(I)

wherein
Q represents an organic radical containing 2 to 30 carbon atoms and having a valence of (3+p) which optionally contains a heteroatom selected from the group consisting of oxygen, sulfur, nitrogen and halogen atoms;
Y is bonded to the carbon atom in group Q and represents a direct bond, an alkylene group containing 1 to 3 carbon atoms or an unsubstituted or substituted phenylene group;
Z represents

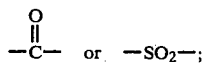

$R_1$ represents a hydrogen atom, or a monovalent organic radical containing 1 to 20 carbon atoms which may contain an amino group containing 1 to 2 active hydrogen atoms and a heteroatom selected from the group consisting of oxygen, nitrogen and halogen atoms;
$R_2$ represents an amino group containing 1 to 2 active hydrogen atoms or a monovalent organic radical containing 1 to 20 carbon atoms which contains at least one amino group containing 1 to 2 active hydrogen atoms and may contain a heteroatom selected from the group consisting of oxygen, nitrogen and halogen atoms;
$R_1$ and $R_2$, together with the nitrogen atom to which they are bonded may represent a 5- to 18-membered nitrogen-containing heterocyclic ring which contains at least one amino group having one active hydrogen atom;
when group Y represents a direct bond and group Z represents

$R_1$ may represent

bonded to that carbon atom of the group Q which is bonded, either directly or through 1 or 2 carbon atoms, to the carbon atom to which the group Y is bonded;
P is 0, 1 or 2; and
when p is 1 or 2, L represents the group

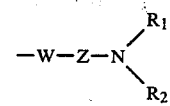

in which W represents a direct bond or an alkylene group containing 1 to 3 carbon atoms and Z, $R_1$ and $R_2$ are as defined above,
(b) contacting the treated microporous substrate interfacially with a solution of a polyfunctional compound containing at least two functional groups capable of reacting with the amino group having one or two active hydrogen atoms, and
(c) optionally heating them to form a thin film of the crosslinked polymer having semipermeability on one side of the microporous substrate.

36. The process of claim 35 wherein the resulting composite membrane is coated with a water-soluble organic polymer.

37. The process of claim 36 wherein the water-soluble organic polymer is polyvinyl alcohol, polyvinyl pyrrolidone or polyvinyl methyl ether.

38. In a method for desalination of saline or brackish water by reverse osmosis comprising contacting the saline or brackish water under pressure with a reverse osmosis membrane, the improvement wherein the membrane of claim 1 is used as the reverse osmosis membrane.

* * * * *